United States Patent
Port

(10) Patent No.: US 9,742,347 B2
(45) Date of Patent: Aug. 22, 2017

(54) MODULAR STRAP MOUNT FOR SOLAR PANELS

(71) Applicant: Jonathan Port, Los Angeles, CA (US)

(72) Inventor: Jonathan Port, Los Angeles, CA (US)

(*) Notice: Subject to any disclaimer, the term of this patent is extended or adjusted under 35 U.S.C. 154(b) by 0 days.

(21) Appl. No.: 14/811,607

(22) Filed: Jul. 28, 2015

(65) Prior Publication Data

US 2015/0349700 A1    Dec. 3, 2015

Related U.S. Application Data

(63) Continuation of application No. PCT/US2013/025622, filed on Feb. 11, 2013.

(51) Int. Cl.
*H02S 20/22* (2014.01)
*F24J 2/52* (2006.01)

(52) U.S. Cl.
CPC ............ *H02S 20/22* (2014.12); *F24J 2/5239* (2013.01); *F24J 2/5241* (2013.01); *F24J 2/5245* (2013.01); *Y02B 10/10* (2013.01); *Y02E 10/47* (2013.01)

(58) Field of Classification Search
CPC ........ H02S 20/22; F24J 2/5245; F24J 2/5241; F24J 2/5239; Y02B 10/10
See application file for complete search history.

(56) References Cited

U.S. PATENT DOCUMENTS

| | | | |
|---|---|---|---|
| 4,611,090 A | 9/1986 | Catella | |
| 6,495,750 B1 | 12/2002 | Dinwoodie | |
| 7,574,842 B2 | 8/2009 | Russell | |
| 7,806,377 B2 | 10/2010 | Strizki | |
| 7,814,899 B1 | 10/2010 | Port | |
| 8,156,697 B2 | 4/2012 | Miros | |
| 8,726,897 B2 * | 5/2014 | Wallgren | F24J 2/4638 126/571 |
| 8,870,139 B1 * | 10/2014 | Port | F24J 2/5241 248/237 |
| 2005/0166383 A1 | 8/2005 | Newberry | |
| 2007/0294977 A1 | 12/2007 | Mitchell | |
| 2011/0314751 A1 | 12/2011 | Jette | |
| 2012/0240489 A1 | 9/2012 | Rivera | |
| 2012/0285515 A1 | 11/2012 | Sagayama | |
| 2014/0109953 A1 * | 4/2014 | Aulich | H02S 20/24 136/251 |

FOREIGN PATENT DOCUMENTS

| | | | | |
|---|---|---|---|---|
| DE | 202010008691 U1 * | 11/2011 | ............ | F24J 2/5209 |
| EP | 2146160 A1 * | 1/2010 | ............ | F24J 2/045 |
| EP | 2182303 A2 * | 5/2010 | ............ | F24J 2/523 |
| EP | 2385326 A2 * | 11/2011 | ............ | F24J 2/4638 |
| EP | 2554925 A2 * | 2/2013 | ............ | F24J 2/4638 |

* cited by examiner

*Primary Examiner* — Jeanette E Chapman
(74) *Attorney, Agent, or Firm* — Belasco Jacobs & Townsley, LLP; Norton Townsley; Georgiy Khayet

(57) ABSTRACT

A method and apparatus for mounting a solar collector panel by itself or supported within a frame, to a surface comprising: a strap assembly, a first attachment device attached to and between the panel or frame and the strap assembly; and a second attachment means for attaching the strap assembly to the surface. The strap assembly comprises a plurality of straps attached end to end. The first attachment device could be a bolt, a screw, adhesive, etc. Alternatively, there could be a support between the panel or frame and the strap assembly. The second attachment means may be: a nail, a spike, adhesive, bolting to a stud attached to the surface, welding, ballast, adhesive tape or combinations of these.

21 Claims, 26 Drawing Sheets

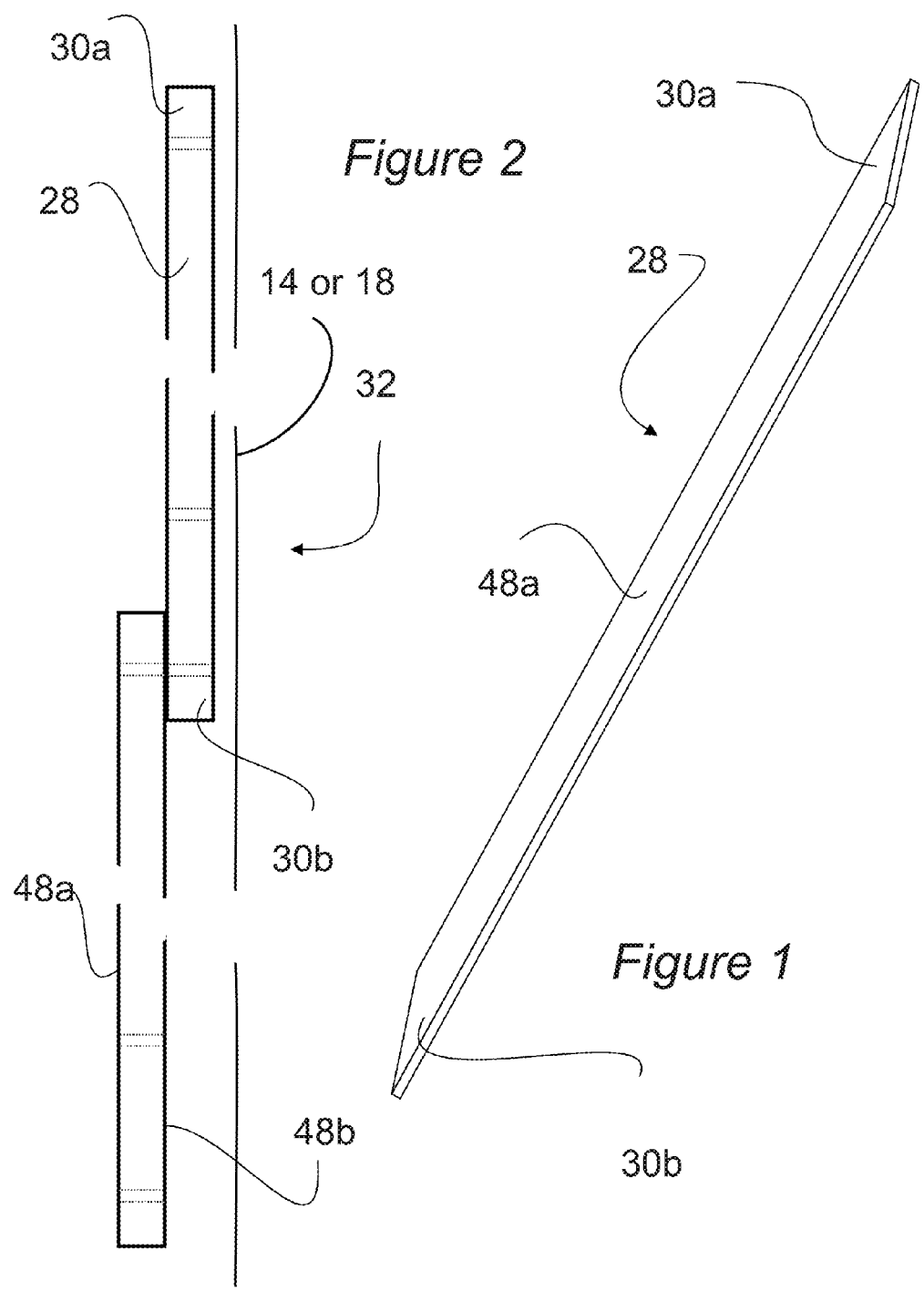

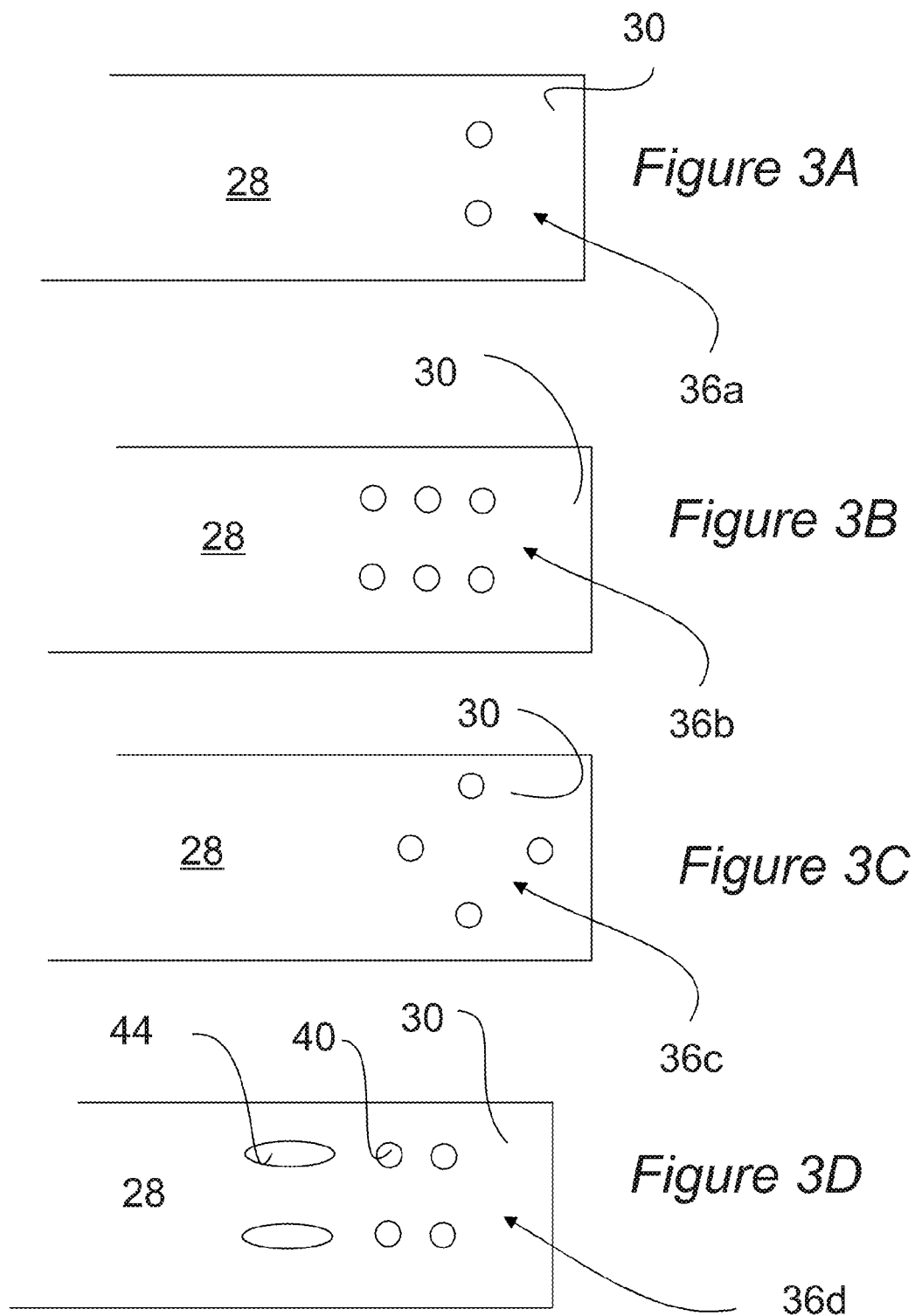

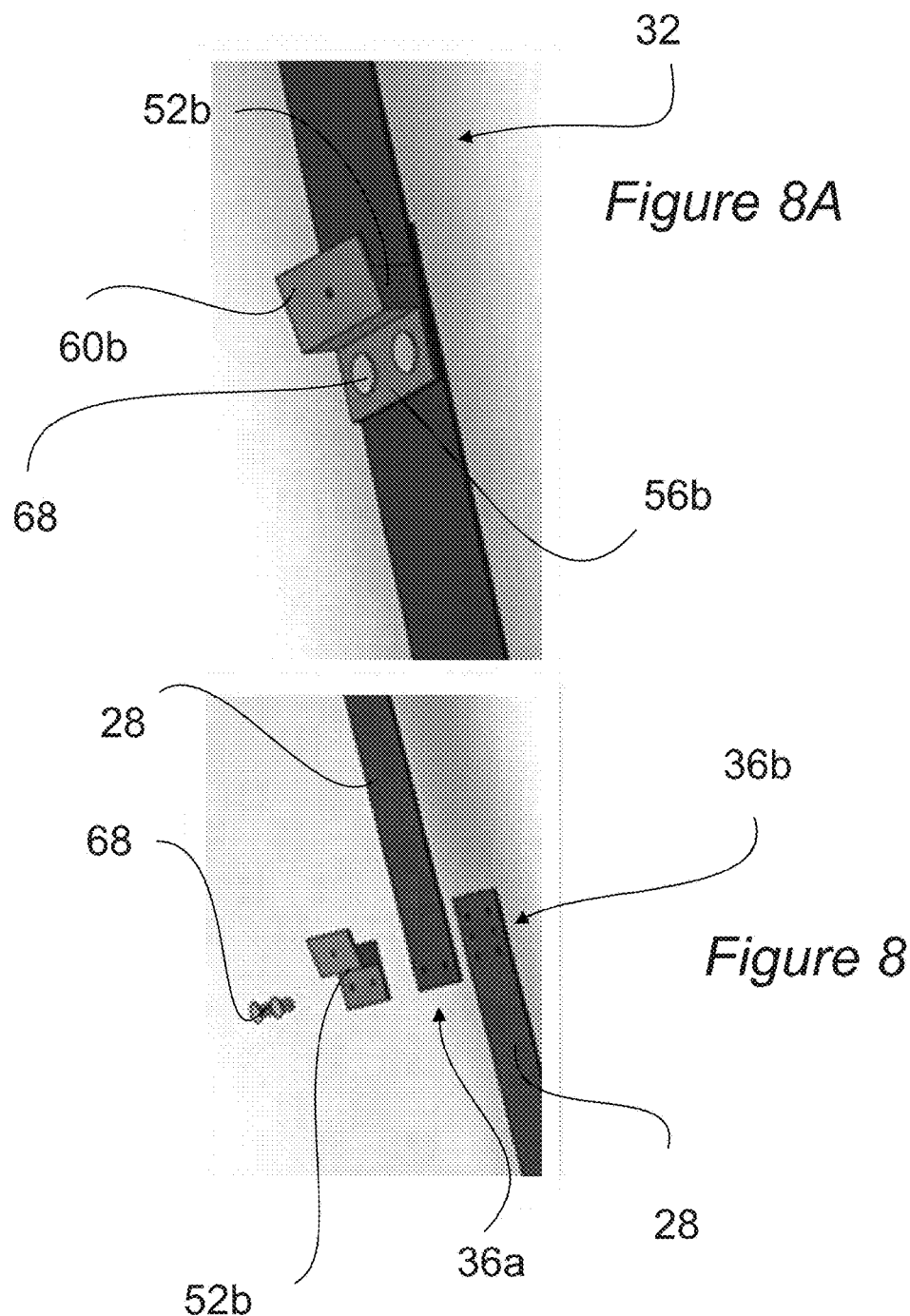

MODULAR STRAP MOUNT FOR SOLAR PANELS

CROSS REFERENCE TO RELATED APPLICATIONS

This application is a Continuation of PCT Patent Application No. PCT/US2013/025622 filed 11 Feb. 2013, the entire specification claims and drawings of which are hereby incorporated by reference.

BACKGROUND OF THE INVENTION (1) Field of the Invention

The present invention relates to the field of solar panels and more particularly to apparatuses and methods for mounting solar panels on surfaces, including roofs, walls and the ground.

(2) Description of the Related Art

Solar panels can be of the photovoltaic type of the thermal type or combinations. They can be installed as is or contained within a frame. Solar panels must be mounted correctly in order to maximize power production and to prevent movement of the panels from the force of wind. The proper solar panel mounting provides stability and the proper directional and latitudinal orientation for the solar array.

Different mounting systems are available depending on whether the modules will be mounted on a roof, a wall, the ground, or a pole. For mounting on a roof or the ground there are ballast mounts, flush mounts (such as Modular Iron-Ridge XRS available from IronRidge in Willits, Calif.) standing seams mounts, and adjustable mounts (such as those available from Unirac in Albuquerque, N. Mex.). These usually include a tilted rack, firmly attached to the substrate surface, on which the modules are firmly mounted; or brackets of at least two different heights, firmly attached to the substrate surface, to which the ends of the modules are firmly attached.

Such systems are heavy and expensive to fabricated and time consuming to install. What is needed is a mounting system which is cheaper to fabricate and less time consuming to install. Preferably the improved system can be easily fabricated on site or provided as a kit. The inventor has developed two improvements on the state of the art: U.S. Pat. No. 7,814,899 and U.S. patent application Ser. No. 13/038,286, the entire texts and drawings of which are included in this document by reference.

This inventor has now developed another improvement on the state of the art. Development of a solar panel mounting system which is cheaper to fabricate and less time consuming to install represents a great improvement in the field of solar panel mounting and satisfies a long felt need of the solar panel installer and owner.

SUMMARY OF THE INVENTION

This invention is an apparatus for mounting a solar collector panel (photovoltaic, thermal or combination), by itself or supported within a frame, to a surface comprising: a strap assembly, a first attachment device attached to and between the panel or frame and the strap assembly; and a second attachment means for attaching the strap assembly to the surface. The strap assembly further comprises a plurality of straps attached end to end.

This invention is also a method of mounting a solar collector panel by itself or supported within a frame, to a surface, comprising the steps of: providing a plurality of straps; attaching the straps together end to end to make a strap assembly; attaching the panel or frame and the strap assembly to each other; and attaching the strap assembly to the surface.

The first attachment device could be a bolt, a screw, adhesive, etc. Alternatively, there could be a support between the panel or frame and the strap assembly. Preferably the support has a top flange and a bottom flange. The top flange may be parallel to the surface of at an angle to the surface. There may be two supports and one may be taller than the other. Furthermore, the length of the support or supports may be wider than the straps and sufficient to span the entire width or length of the solar panel and frame assembly.

Preferably each end of each strap is drilled (and even more preferably predrilled) with a hole pattern through which the straps are attached end to end. Also, preferably, the bottom flange of the support has the same hole pattern drilled into it so that the bottom flange can be attached to two strap ends at the same time and with the same fasteners. Additionally the straps may have different widths.

The means for attaching the strap assembly to the surface may be: a nail, a spike, adhesive, bolting to a stud attached to the surface, welding, ballast, adhesive tape or combinations of these.

Alternatively, the support may comprise a U shaped channel having a base and an opening opposite the base. In this case the base is attached to the strap assembly. Preferably, the solar panel or the panel and frame assembly is clamped to the top of the channel by fastening together with a threaded fastener a plate slidably installed, parallel to the base in the channel; and a clip, adapted to clamp to the frame, placed on the frame, transverse to the frame, over a top edge of the frame at a side of the frame.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

An appreciation of the other aims and objectives of the present invention and a more complete and comprehensive understanding of it may be achieved by referring to the accompanying drawings and studying the following description of the best mode of carrying out the invention.

BRIEF DESCRIPTION OF THE DRAWINGS

FIG. 1 is a perspective view of a strap of this invention.

FIG. 2 is a side view of two straps assembled into a strap pack in accordance with this invention.

FIGS. 3A to 3D illustrate different hole patterns that can be made in the ends of the straps.

FIG. 8 illustrates in exploded view assembly of a bracket with two modular straps.

FIG. 8A is a magnified view of the assembly of FIG. 8 fully assembled.

DETAILED DESCRIPTION OF THE PREFERRED EMBODIMENT

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 7:
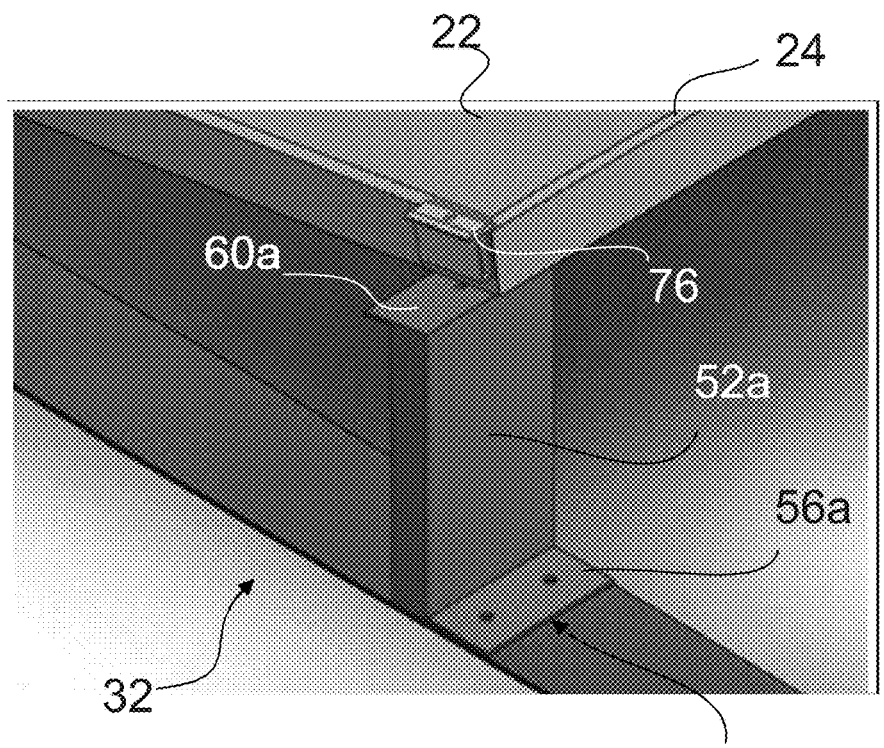
FIG. 7 is a magnified view of the attachment between a bracket and the solar panel and the bracket and a modular straps.

This invention 10 has two major embodiments: one 10a that is intended primarily to be attached to a flat surface 14, such as a roof or wall; and one that is intended to be attached primarily to a tilted surface 18, such as a peaked roof. However, in fact, either embodiment can be attached to a flat 14 or tilted 18 surface. As described in U.S. Pat. No. 7,814,899, solar panels 22 may be retained within a frame 24 (as shown in FIG. 7), which has a number of holes useful for mounting.

FIG. 1 illustrates the modular strap 28 of this invention. It is made of thin sheet material such as steel or aluminum, preferably ⅛ inch thick. A number of these straps are attached together end 30a to end 30b as shown in FIG. 2 to form a strap assembly 32. Fastening can be done by nuts and bolts, screws, rivets or blind fasteners, such as Jo-Bolts, pop rivets, Huck bolts, etc. To facilitate assembly of the straps 28 one to another they are preferably predrilled with a hole pattern 36 at each end as illustrated in FIGS. 3A through 3C. Since only two holes are needed to produce a secure connection, the pattern 36b shown in 3B allows for the straps 28 to be connected together to make slight adjustment in the total length of the strap assembly 32. As shown in FIG. 3D two or more of the holes 40 could actually be slots 44 which allows for some margin of error in assembly.

Figure 4:
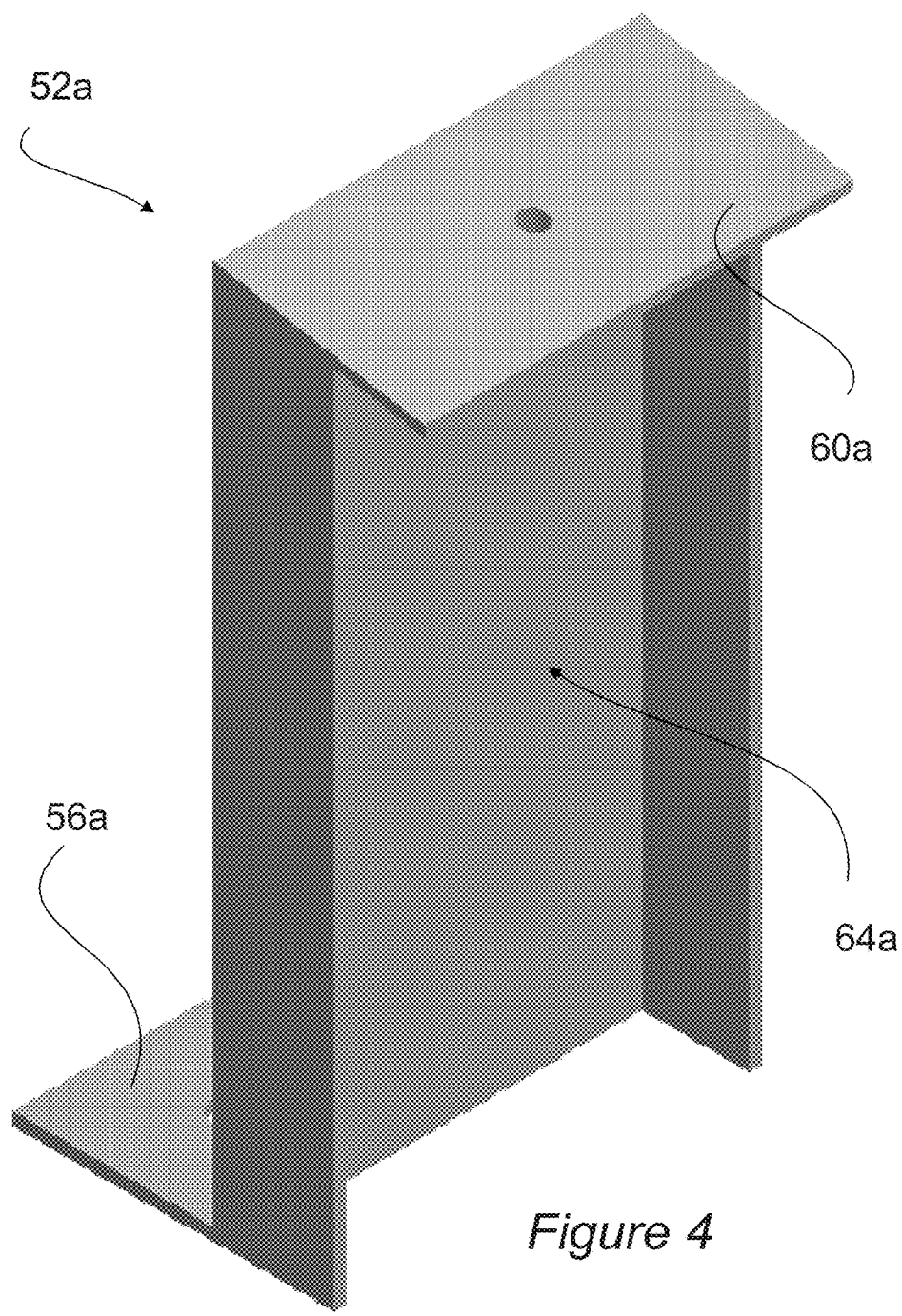
FIG. 4 is a perspective view of the taller bracket used for flat roof installations of this invention.
Figure 5:
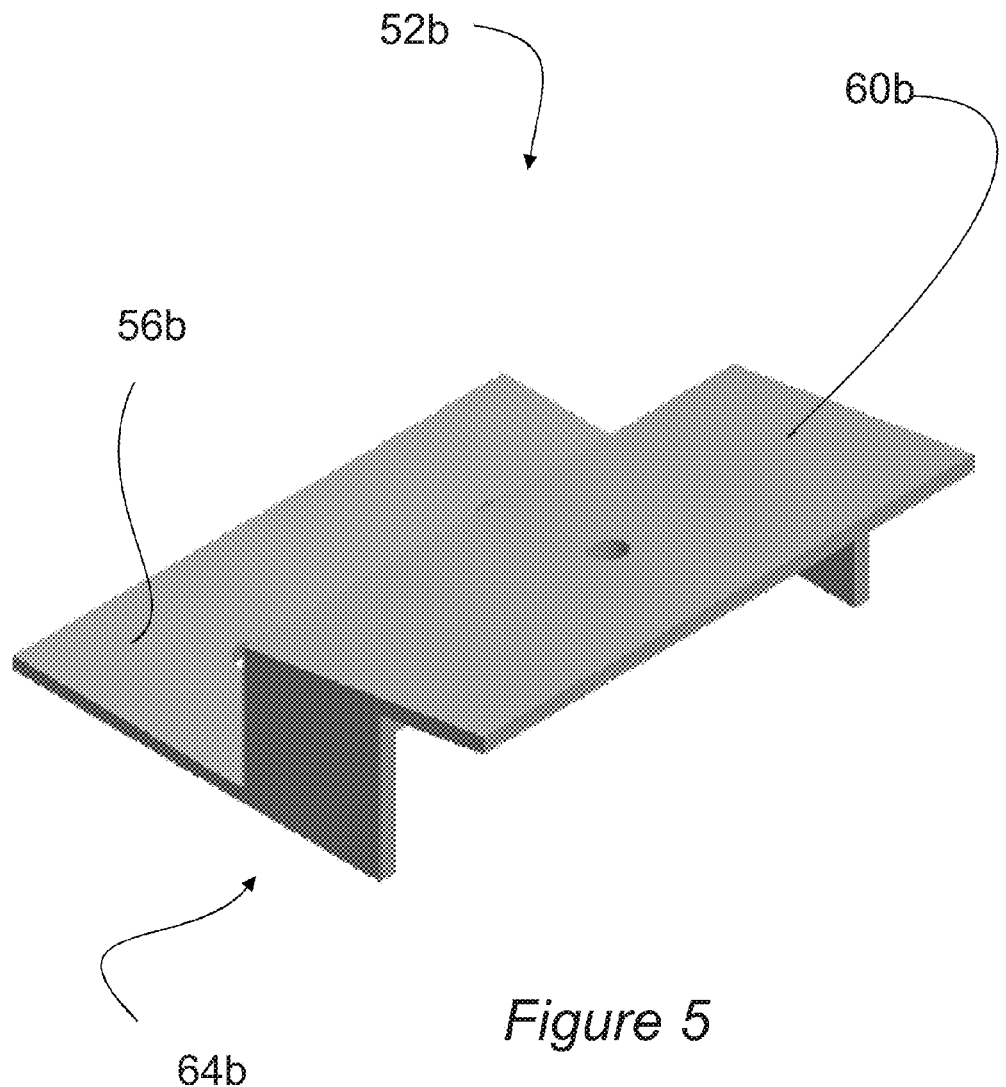
FIG. 5 is a perspective view of the shorter bracket used for flat roof installations of this invention.
Figure 6A:
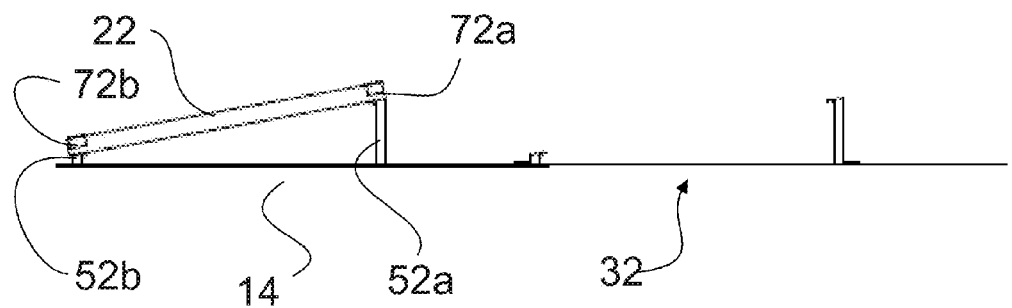
FIG. 6A is a side view of two units of the embodiment of this invention typically intended for installation on a flat roof.
Figure 6B:
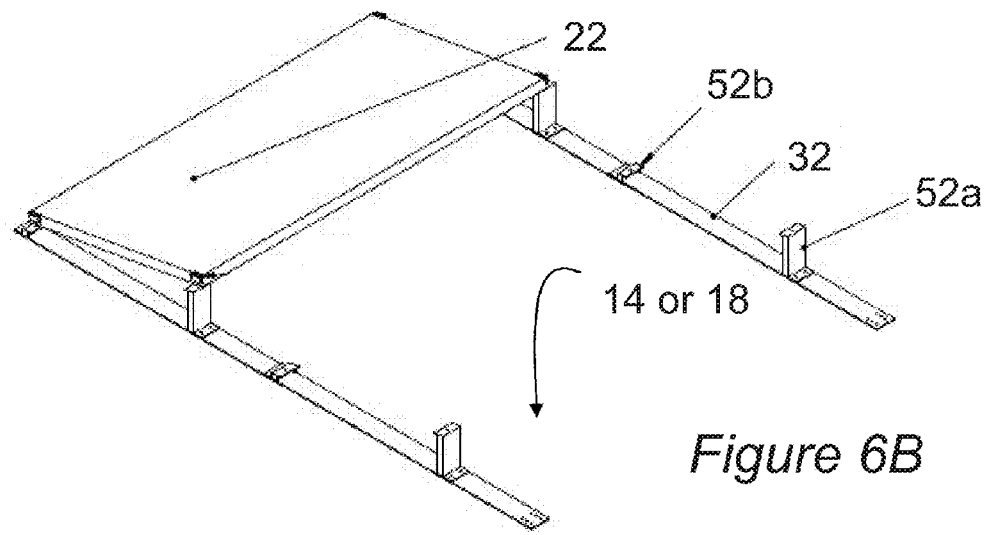
FIG. 6B is a perspective view of two units of the embodiment of this invention typically intended for installation on a flat roof.
Figure 6C:
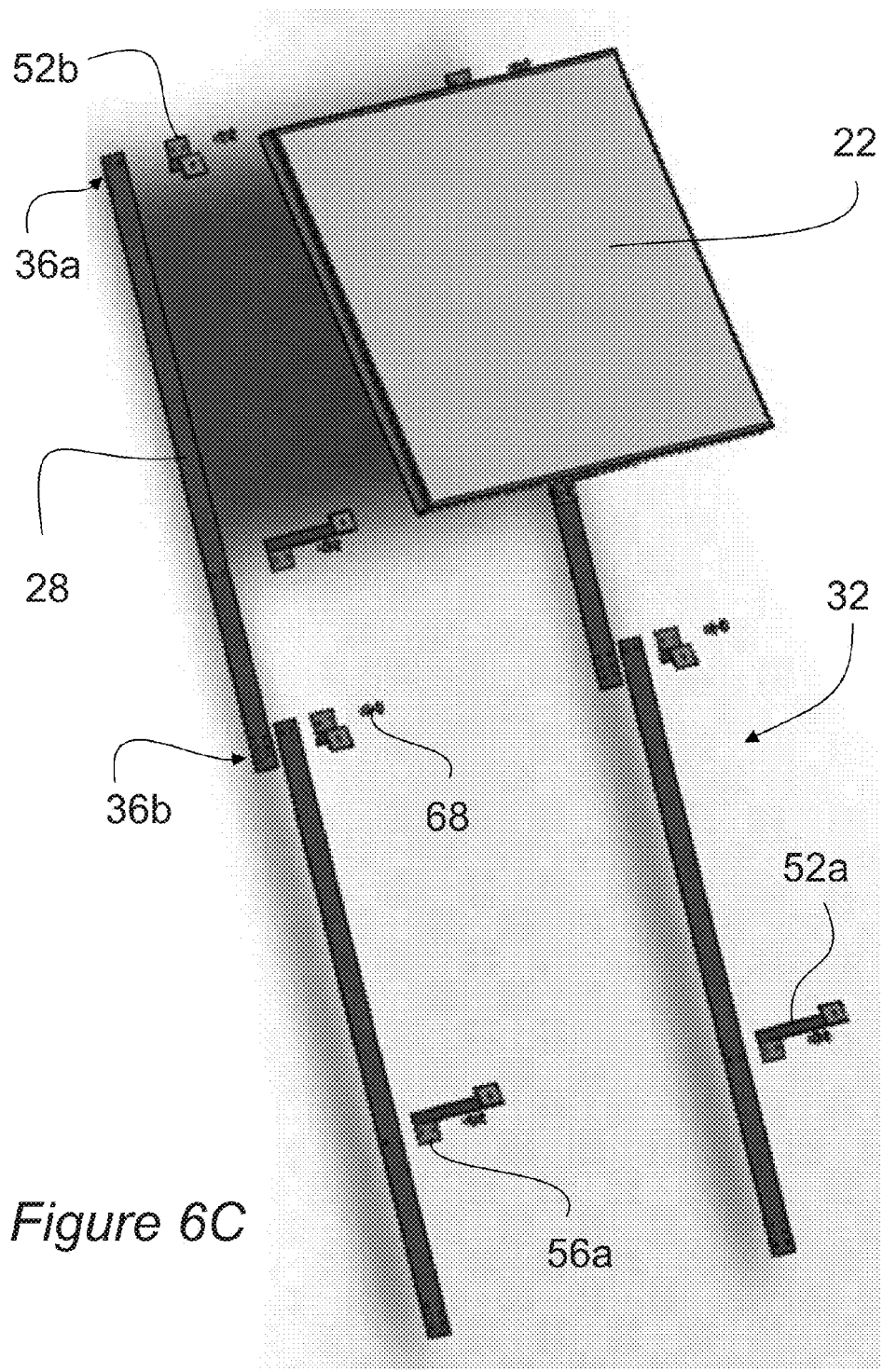
FIG. 6C is a perspective, exploded view of two units of the embodiment of this invention typically intended for installation on a flat roof.

In the flat surface embodiment 10a, attached to the top 48a of the straps are one or two brackets 52a, 52b as shown in FIGS. 4 and 5. As can be seen they each have a bottom flange 56a, 56b, a top flange 60a, 60b and a central body 64a, 64b. In these brackets 52a, 52b the bodies 64a, 64b have a C shaped cross section but they could be Z shaped or I shaped or any other cross sectional shape. As can be seen, when two brackets 52a, 52b are used, preferably one bracket 52a is taller than the other 52b. As shown in FIGS. 6A, 6B and 6C, the taller one 52a is attached to the strap assembly 32 at a point which will be close to the end of the solar panel frame 24 which is intended to be higher and the shorter one 52b is attached to the strap assembly at a point which will be close to the other end of the solar panel frame. The brackets 52 are attached to the strap assemblies 32 through their bottom flanges 56. Again fastening can be done by nuts and bolts, screws, rivets or blind fasteners, such as Jo-Bolts, pop rivets, Huck bolts, etc. 68. Then the solar panel frame 24 is clamped to the top flange 60 of the brackets 52, preferably using the teachings of U.S. Pat. No. 7,814,899. FIG. 7 illustrates assembly of the clip 76 to the top flange 56 of the bracket 52 except that one panel 22, its frame 24 and the adjustable fastener is not shown.

In order to simplify assembly and reduce labor and material costs, at least one bracket 52 and two strap ends 30 can be attached together with the same fasteners 68 at the same time. This is illustrated in FIGS. 8 and 8A. Of course the bottom flange 56 of the bracket 52 must be provided with the same hole pattern 36 as that on the strap ends 30 or at least a hole pattern 36 that will mate with the hole pattern 36 in the strap end 30.

Various devices and methods can be used to fasten the strap assemblies 32 to surfaces 14, 18, depending on the inclination of the surface 14, 18 and the material it is made out of. These are illustrated in FIGS. 9, 10, 10A, 11, 12, 12A and 13.

Figure 9:
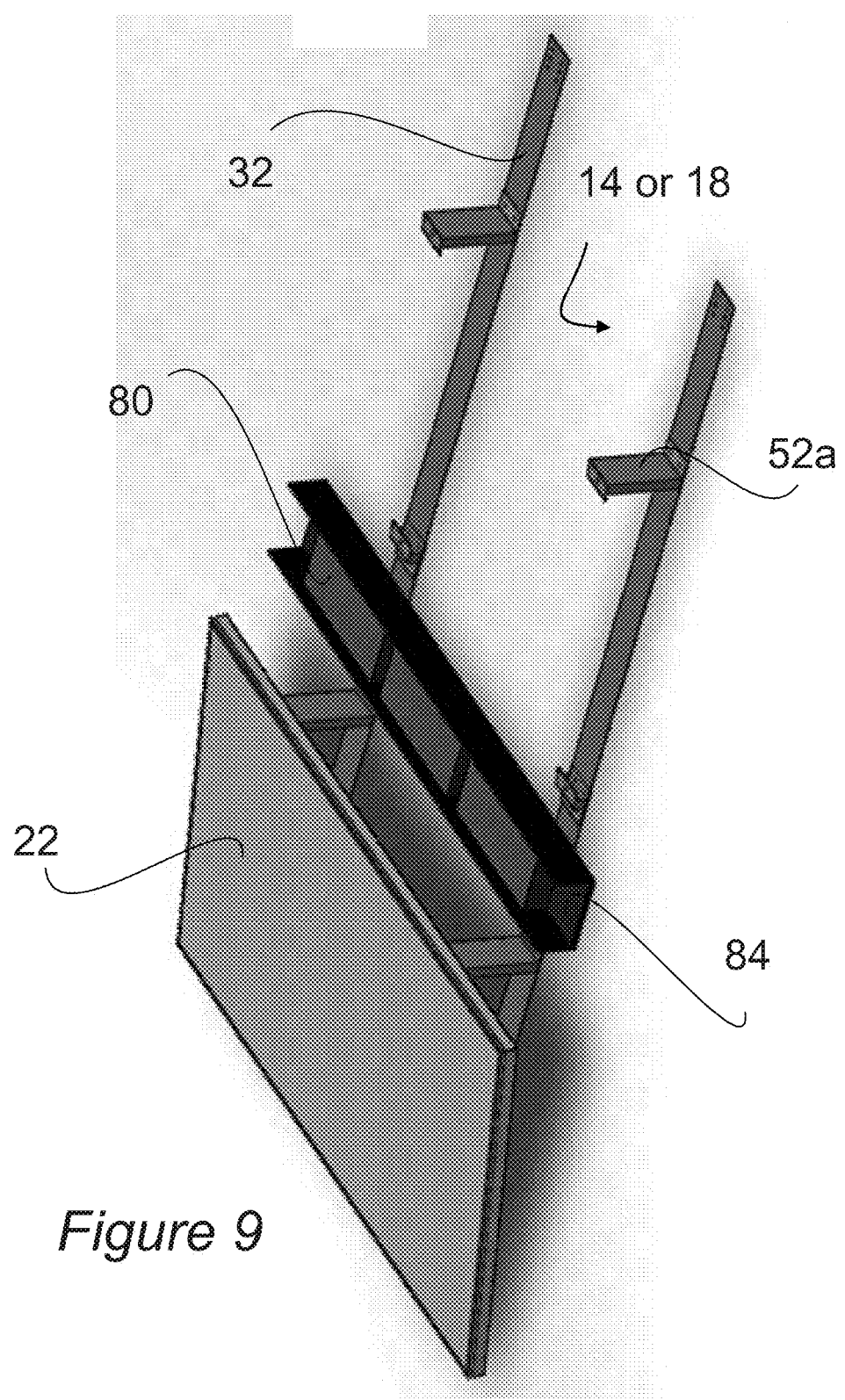
FIG. 9 is a perspective view of a flat roof installation of this invention in which the modular strap assemblies are held down with ballast.

FIG. 9, illustrates ballast 80. The ballast 80 can be any object made out of a weighty material. Satisfactory objects are bricks, blocks of concrete, blocks of metal, etc. The ballast 80 can be contained within a container 84 for convenience and to span the distance between strap assemblies 32. The objects 80 and/or the container 84 can be just placed on the strap assemblies 32 or can also be fastened to the strap assemblies 32.

Figure 10:
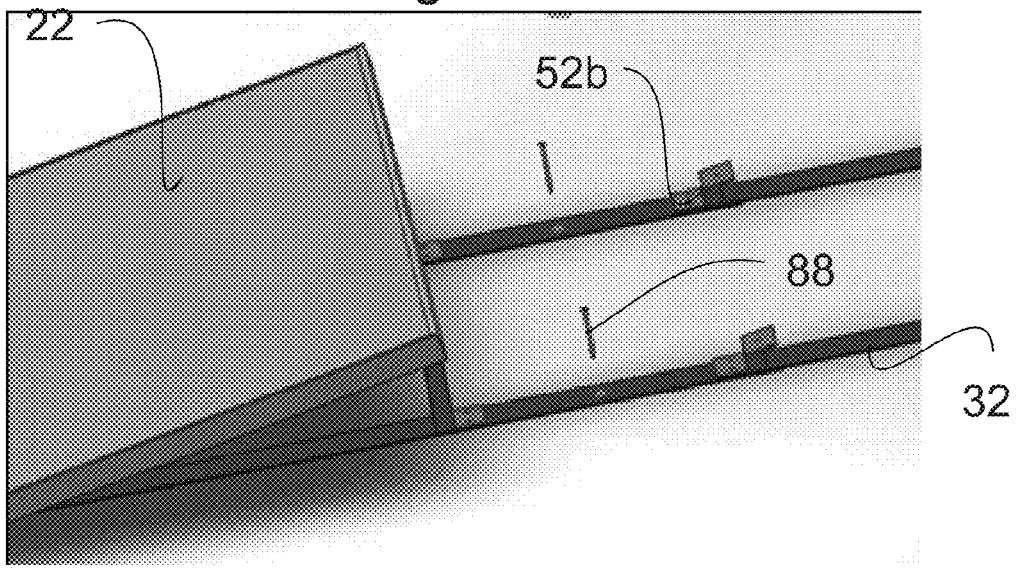
FIG. 10 is a perspective view showing attachment of modular straps used in a flat roof installation with nails, spikes or screws.
Figure 10A:
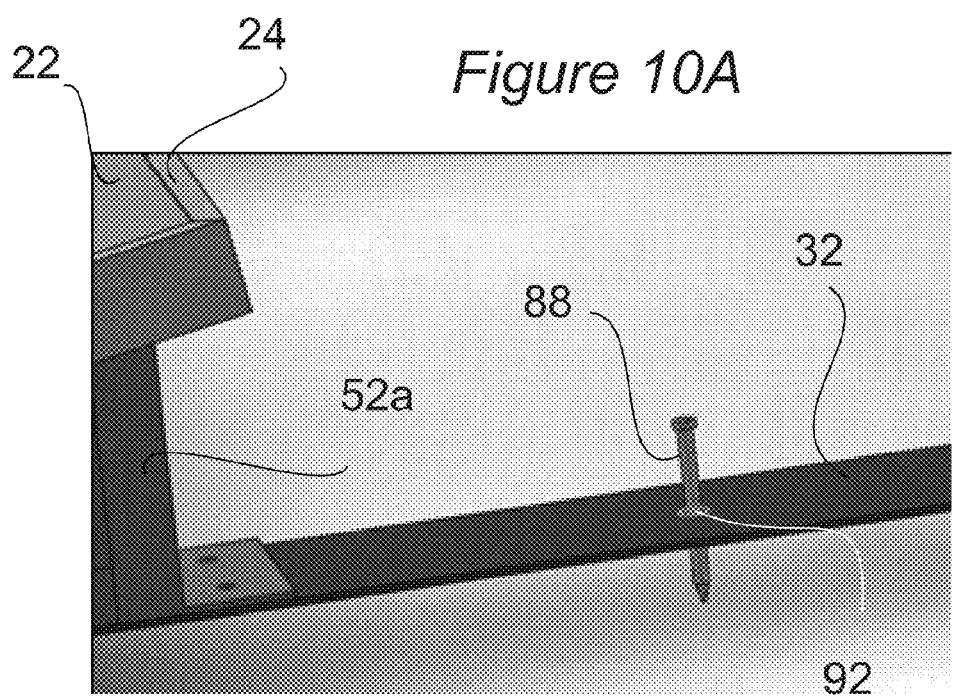
FIG. 10A is a magnified view of FIG. 10 showing the fastener through a hole in the strap assembly.

FIGS. 10 and 10A illustrate use of pointed fasteners 88 such as nails, spikes, or screws. They are fastened into the substrate 14, 18 through holes 92 in the strap assemblies 32. The holes 92 may be predrilled for convenience.

Figure 11:
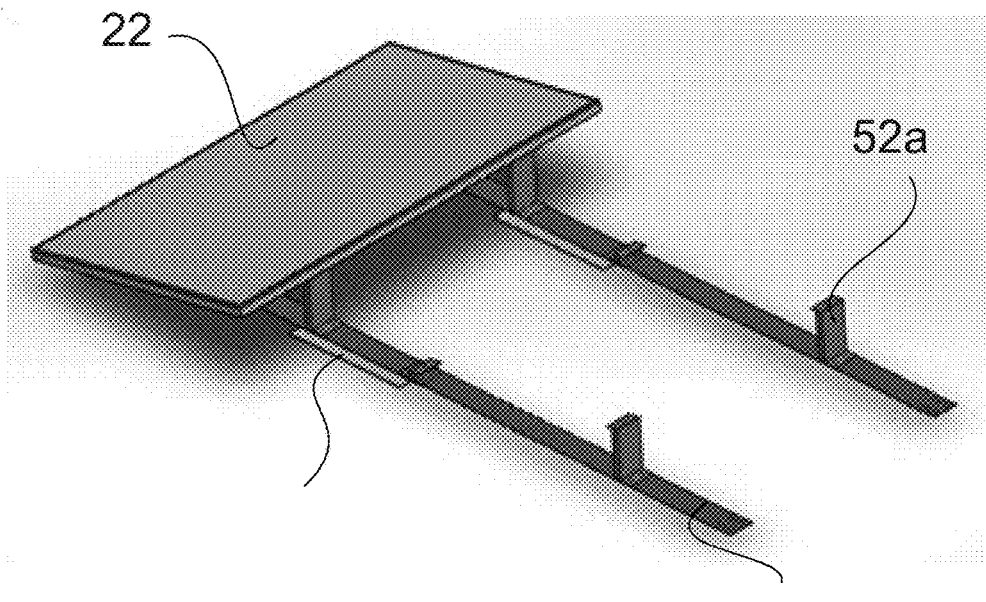
FIG. 11 is a perspective view of a flat roof installation of this invention in which the modular strap assemblies are held down with adhesive.

FIG. 11 illustrates use of adhesive 96 to adhere the strap assemblies 32 to the substrate 14, 18. Any suitable adhesive 96 can be used. It may be catalyzed, in liquid or tape form or any other suitable configuration.

Figure 12:
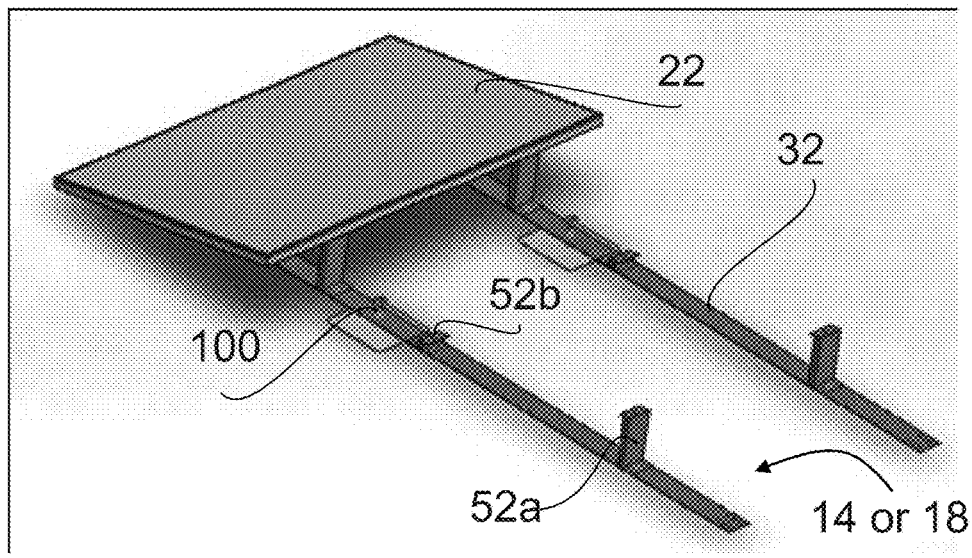
FIG. 12 is a perspective view of a flat roof installation of this invention in which the modular strap assemblies are held down with studs.
Figure 12A:
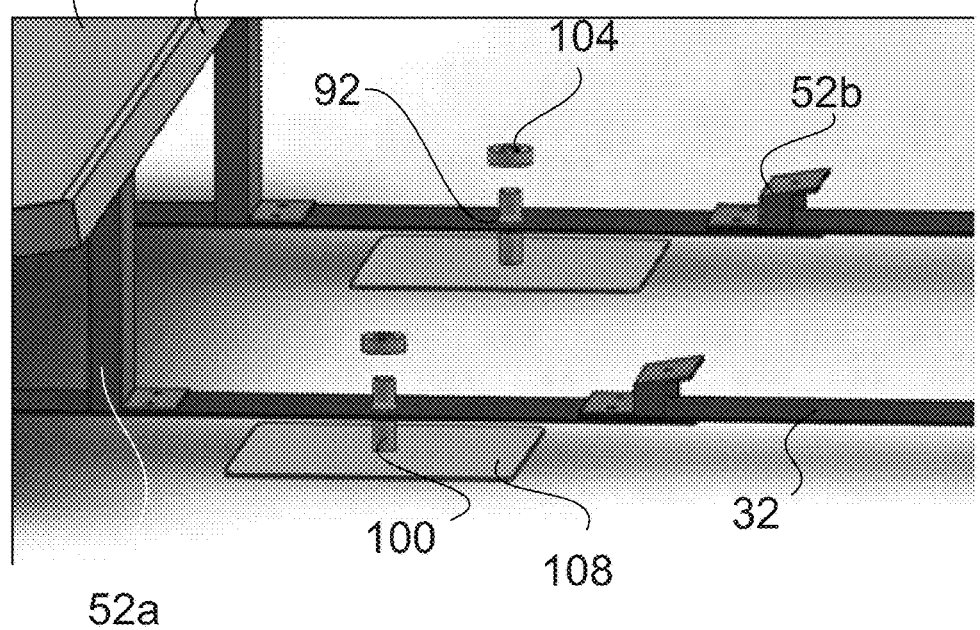
FIG. 12A is an exploded, magnified, perspective view of a flat roof installation of this invention in which the modular strap assemblies are held down with studs.

FIGS. 12 and 12A illustrate the use of threaded studs 100 for fastening down the strap assemblies 32. The studs pass through holes 92 in the assemblies 32 and the straps 28 are fastened to the studs 100 with nuts 104. The studs 100 must be pre-joined to the substrate 14, 18 such as with inserts or, as illustrated, in FIG. 12A by fastening a plate 108 trapped on the stud 100 to the substrate 14, 18. Again this plate 108 may be fastened to the substrate via any suitable method such as nails or adhesive.

Figure 13:
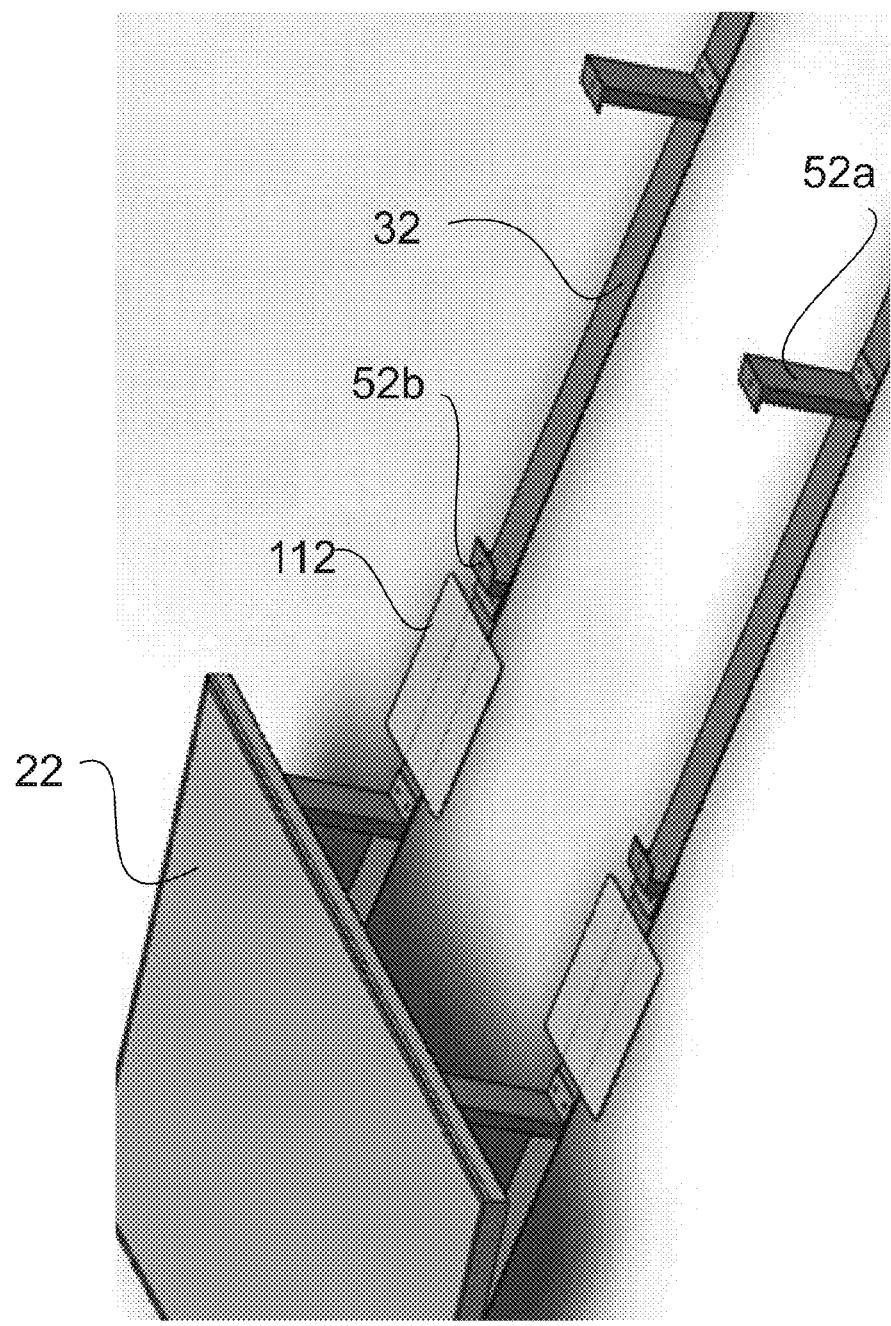
FIG. 13 is a perspective view of a flat roof installation of this invention in which the modular strap assemblies are held down by welding.

FIG. 13 illustrates use of welding for fastening down the strap assemblies 32. In this method, a strip of roofing material 112 is laid over the strap assembly and bonded to the underlying roof material.

Figure 14:
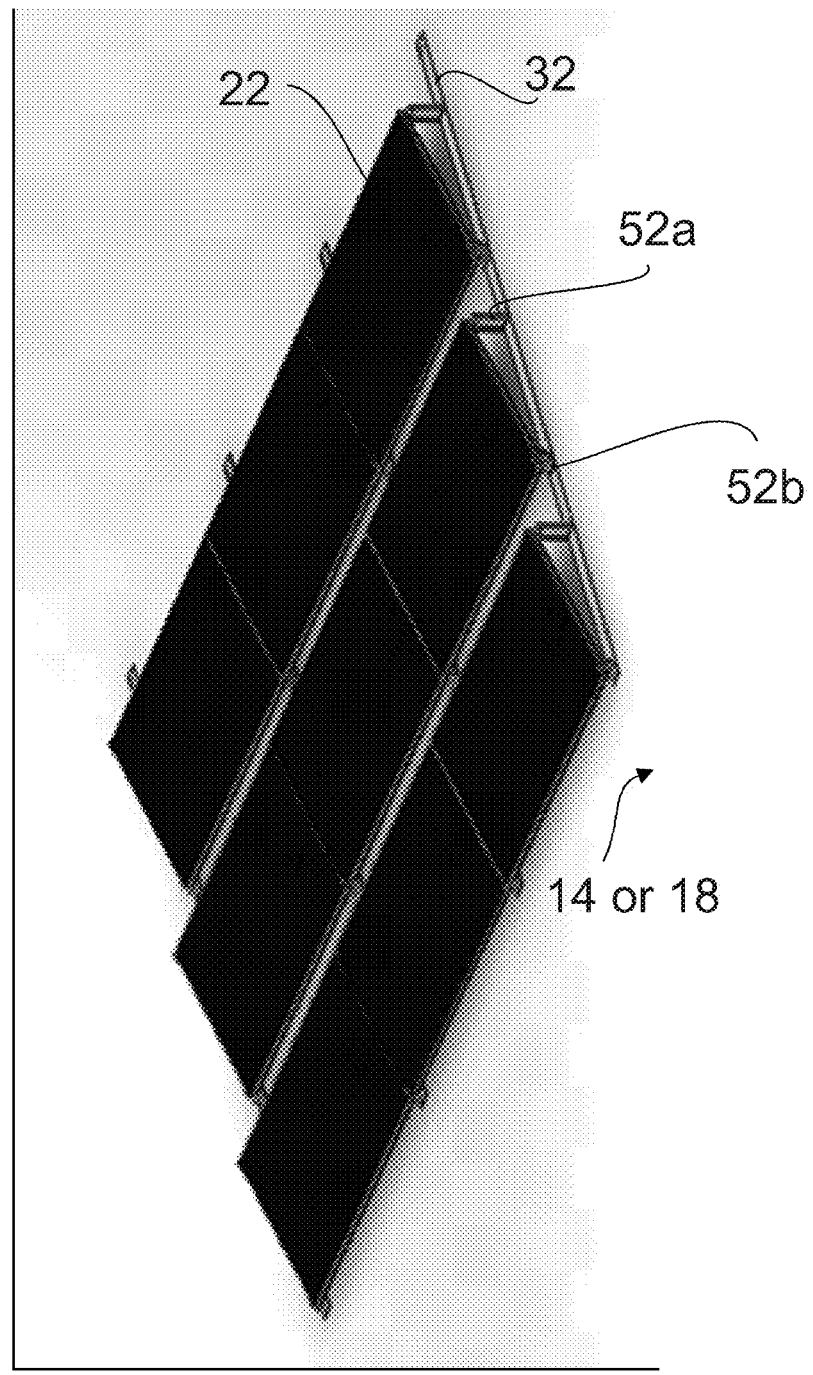
FIG. 14 is a perspective view of an array of multiple solar panels installed on a flat roof with the mounting system of the instant invention.

FIG. 14 shows an array of solar panels 22 constructed on a flat surface 14 in accordance with the teachings of this invention.

Figure 15:
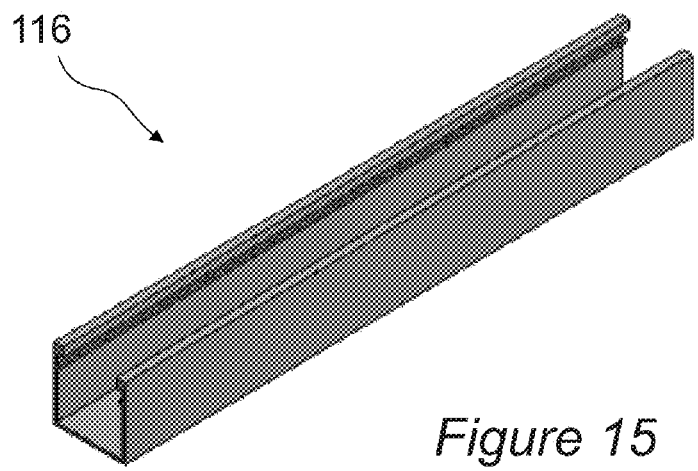
FIG. 15 is a perspective view of a mounting channel used in this invention.

FIG. 15 shows the channel 116 which is used to mount solar panels to strap assemblies 32 on flat or tilted substrates 18, e.g. pitched roofs. First the channel 116, which may be predrilled, is fastened to the strap assembly 32. The hole pattern 36c shown in FIG. 3C is most useful for this purpose since the channel 116 can be mounted parallel with or transverse to the strap assembly 32 as required.

Figure 16:
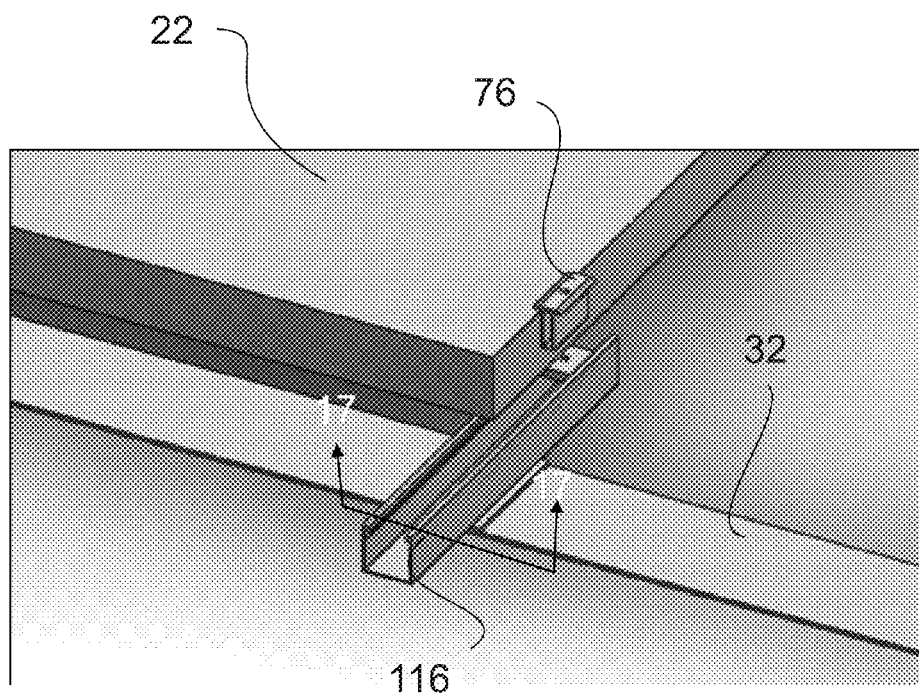
FIG. 16 is an exploded perspective view of attachment of the solar panel to the modular strap via the channel.

FIG. 16 shows an assembly of solar panels 22 to straps 28 using the channel 116 transverse to the strap assembly 32. In FIG. 16 the fasteners are not shown for clarity of understanding.

Figure 17:
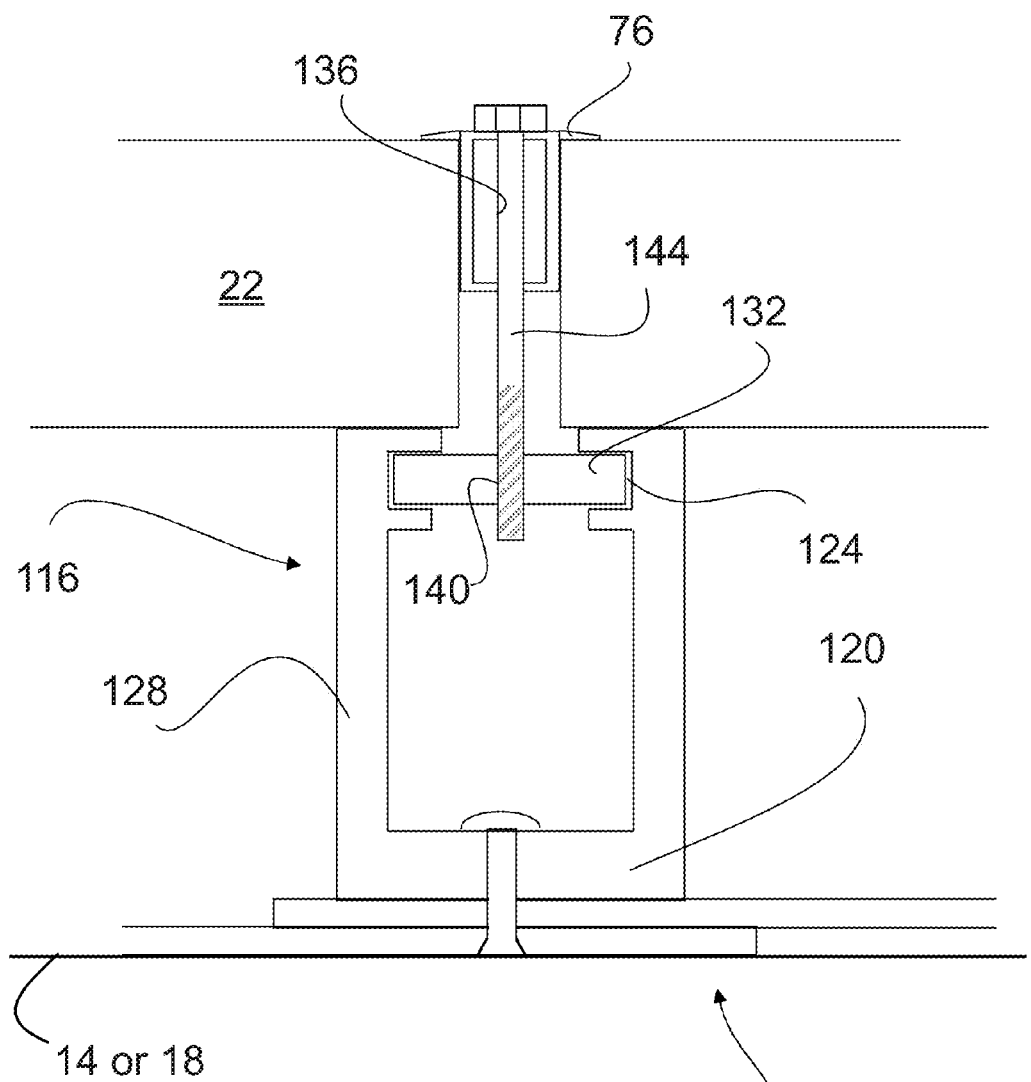
FIG. 17 is a cross sectional view along the lines 17-17 of FIG. 16.
Figure 18:
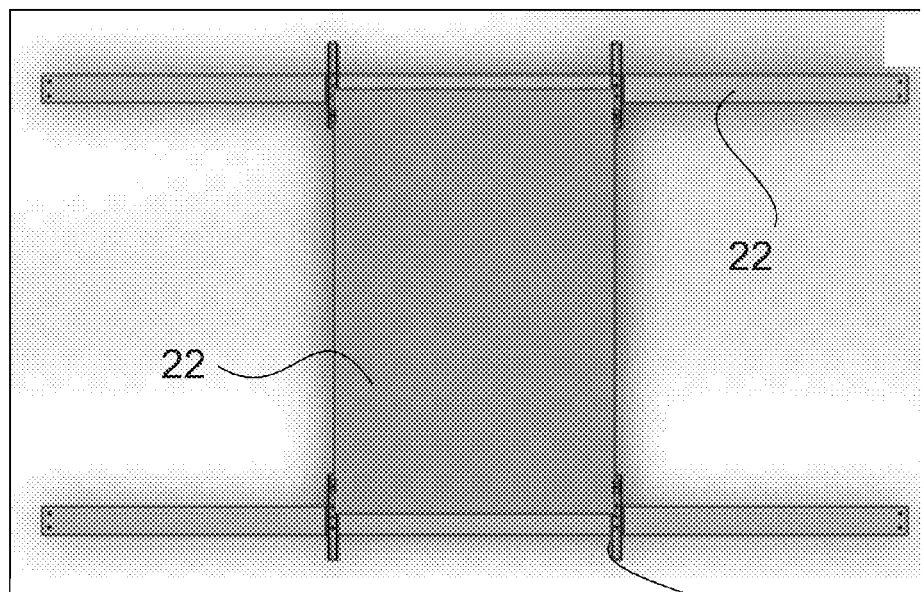
FIG. 18 is a plan view of one solar panel installed on modular straps on a flat or tilted roof in accordance with the teachings of this invention in which the ends of the solar panel are installed to overlay one half the width of the modular strap and the channels are transverse to the strap assemblies.
Figure 23A:
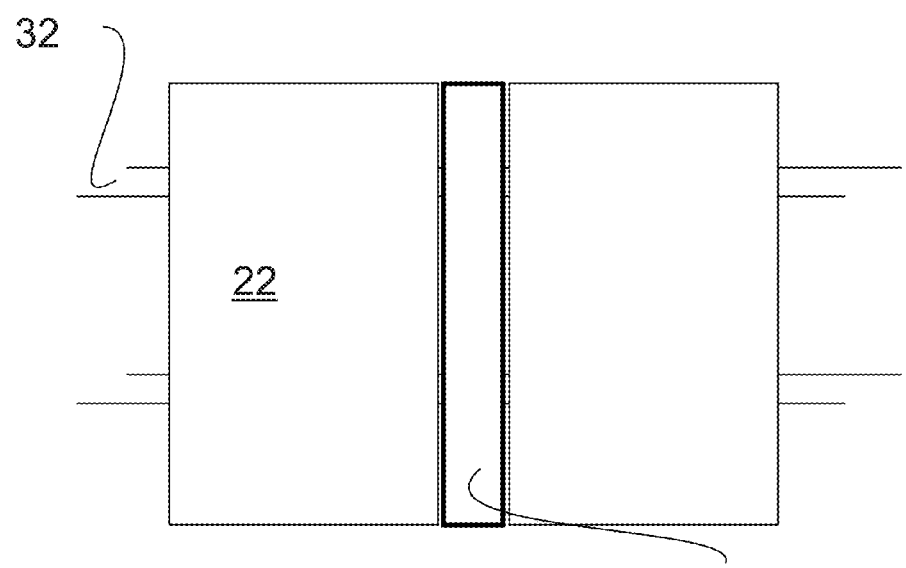
FIG. 23A is a top view of a method of holding a modular strap to a flat or tilted roof using ballast.
Figure 18A:
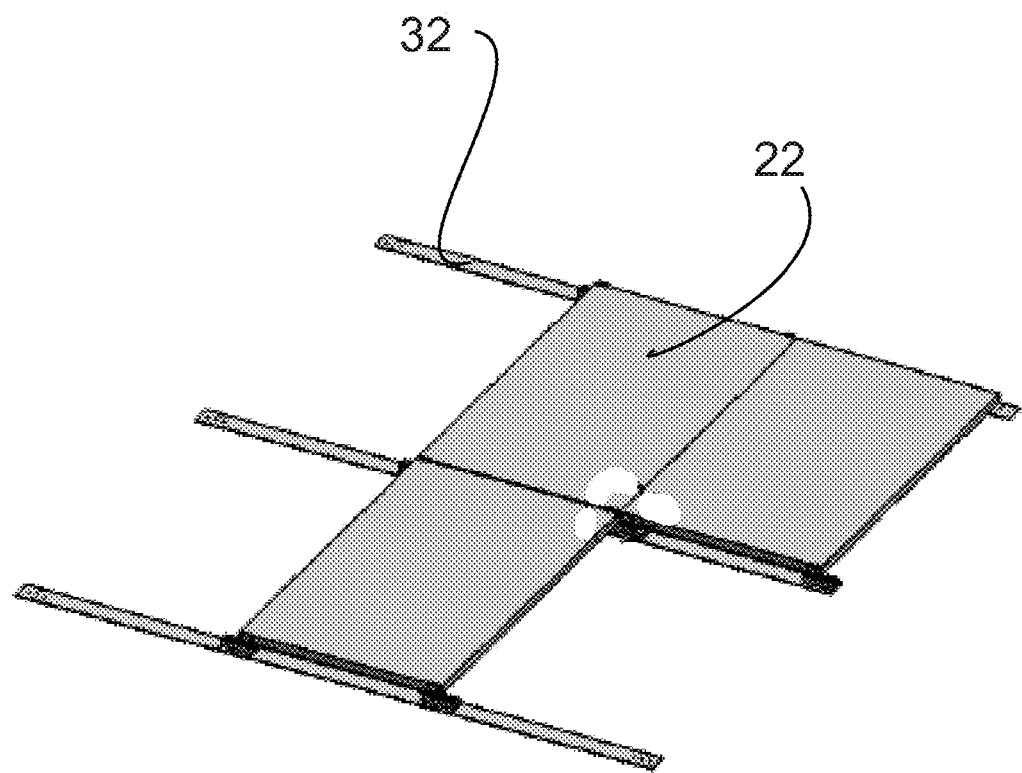
FIG. 18A is perspective view of three solar panels installed on modular straps on a flat or tilted roof in accordance with the teachings of this invention in which the ends of the solar panels are installed to overlay one half the width of the modular strap and the channels are parallel to the strap assemblies.

FIG. 17 is a cross section of this assembly showing the fasteners. The channel 116 is fastened through its bottom 120 to the strap assembly 32. A clip 76 goes over the top edge of one or two solar panel frames 24. The channel 116 has slots or grooves 124 on each side 128 in which a plate 132 can slide. There is a central through hole 136 perpendicularly through the clip 76 and the plate has a threaded hole 140 in its center. A threaded bolt 144 is inserted through the through hole 136 and fastened into the threaded hole 140. Tightening the bolt 144 firmly clamps the solar panel frames 24 to the channel 116. FIG. 18 illustrates an assembly of a solar panel 22 to strap assemblies 32 with transverse channels 116. FIG. 18A illustrates assembly of several solar panels 22.

Figure 17A:
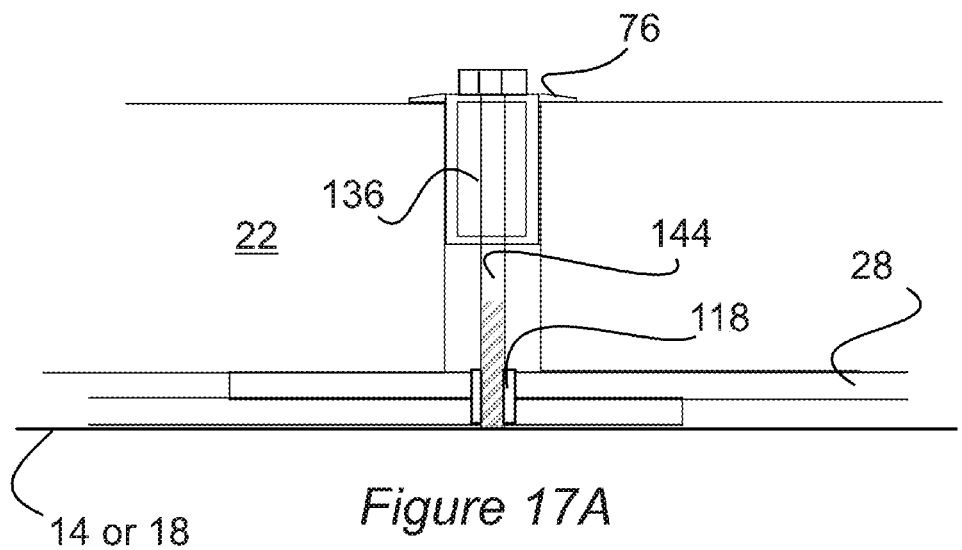
FIG. 17A is cross section showing an alternate way of attaching panels directly to the strap assemblies using the clip and bolt clamping assembly.
Figure 17B:
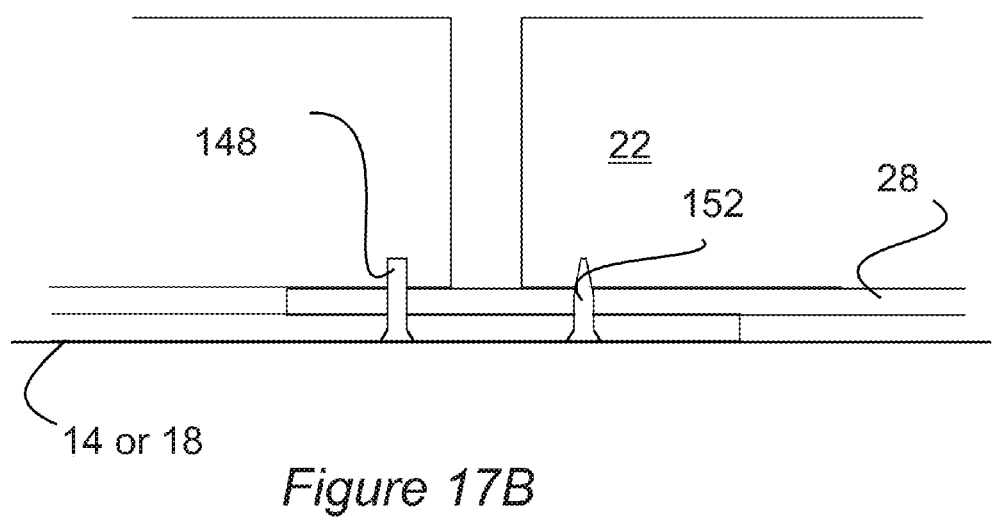
FIG. 17B is cross section showing another alternate way of attaching panels directly to the strap assemblies.

The solar panels 22 or the frames 24 can be attached directly to the straps 28. Alternate was of doing this are shown in FIGS. 17A and 17B. FIG. 17A shows use of a clip and bolt to clamp the panel 22 to the strap 28. A threaded insert 118 is inserted into the straps and receives the threaded end of the bolt 144. Tightening the bolt 144 into the insert 118 clamps the panels 22 to the straps 28. FIG. 17B shows an alternate method. In this method the straps 28 are bolted or screwed to the underside of the panel 22. Those familiar with the art to which this invention applies will realize that other methods can also be used.

Figure 19:
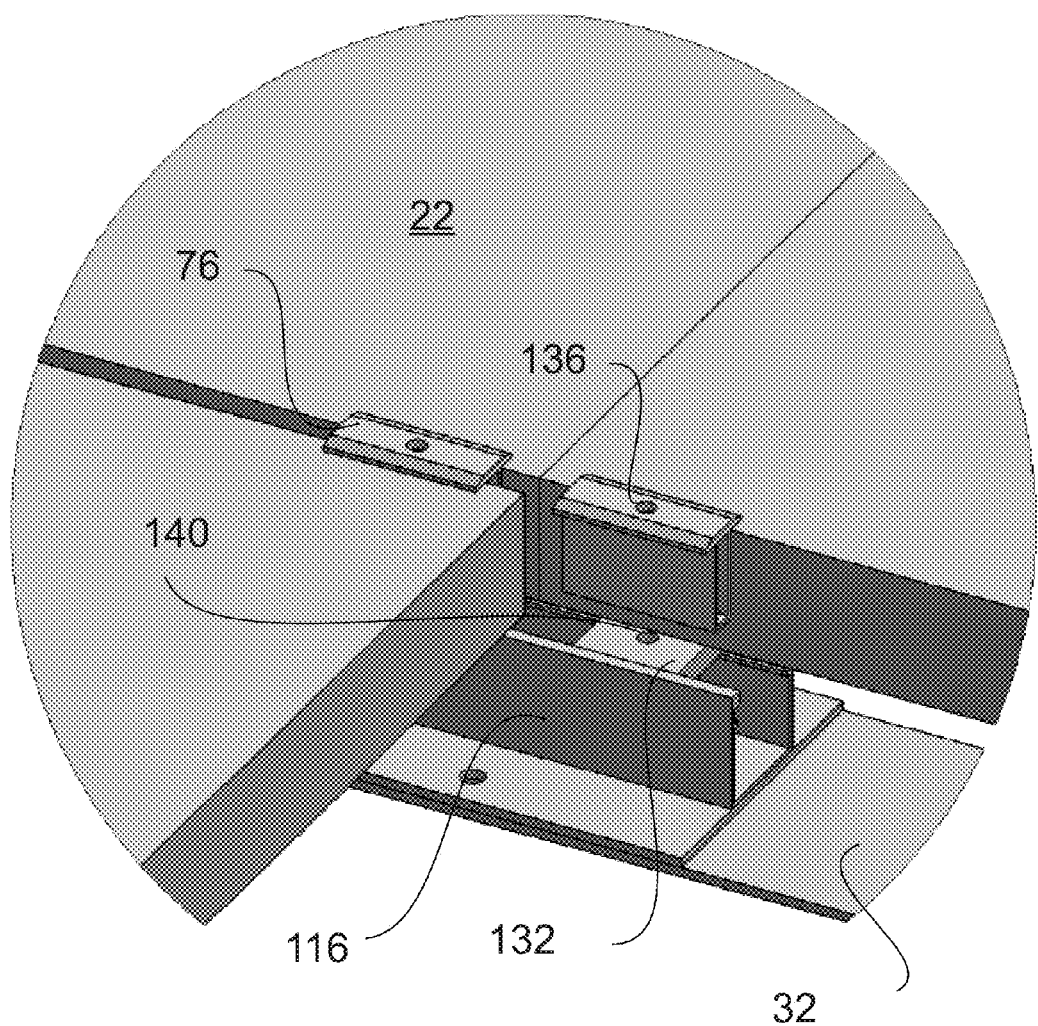
FIG. 19 is an enlarged perspective view of the area shown at 19 on FIG. 18A.

FIG. 19 shows an assembly of solar panels 22 to straps 28 using the channel 116 parallel to the strap assembly 32. In FIG. 19 the fasteners are not shown but they are the same as shown on FIG. 17.

Various devices and methods can be used to fasten the strap assemblies of this embodiment to surfaces, depending on the inclination of the surface and the material it is made out of. These are illustrated in FIGS. 20, 21, 22, 22A, 23 and 23A.

Figure 20:
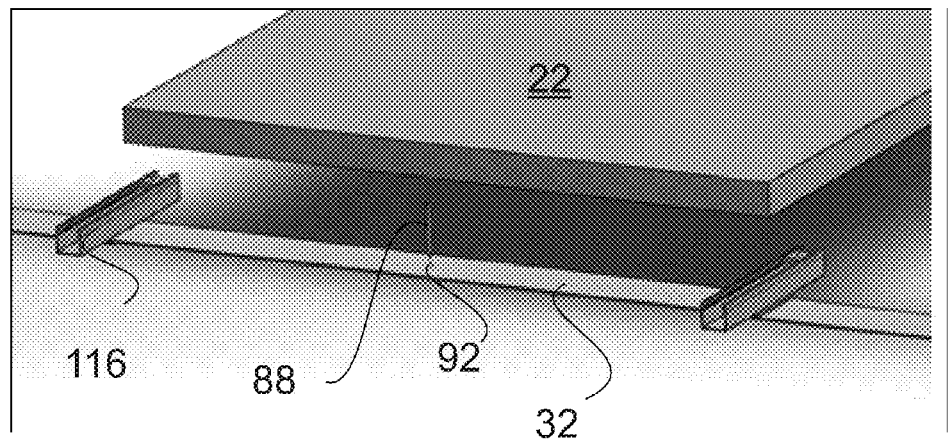
FIG. 20 is an exploded, perspective view showing a method of attaching a modular strap to a flat or tilted roof using a spike or similar fastener.

FIG. 20 illustrates use of pointed fasteners 88 such as nails, spikes or screws. They are fastened into the substrate 18 through holes 92 in the strap assemblies 32. The holes 92 may be predrilled for convenience.

Figure 21:
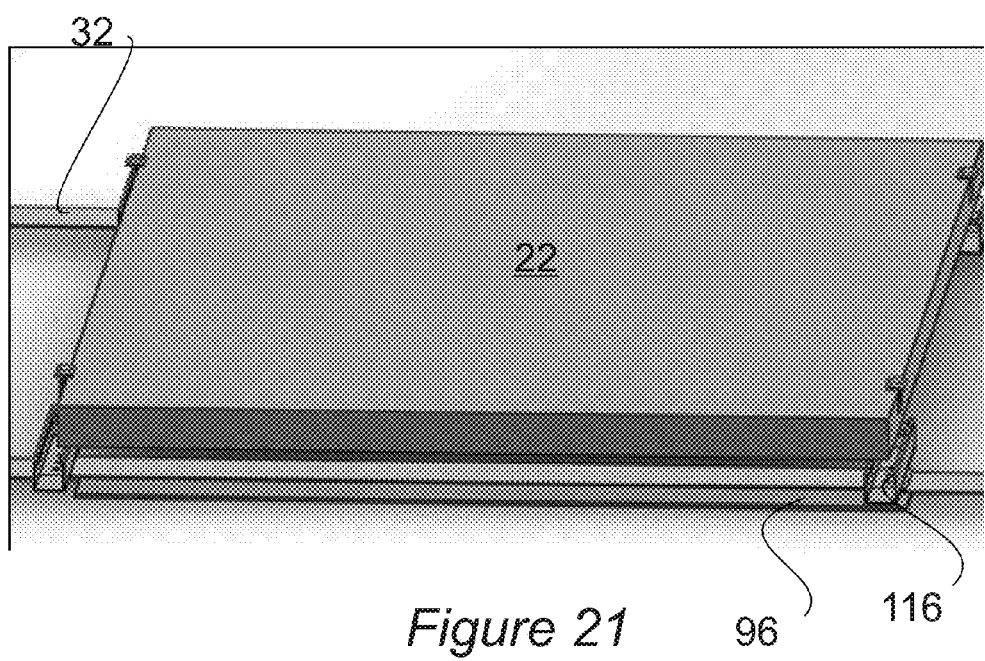
FIG. 21 is a perspective view showing a method of attaching a modular strap to a flat or tilted roof using adhesive.

FIG. 21 illustrates use of adhesive 96 to adhere the strap assemblies 32 to the substrate 18. Any suitable adhesive 96 can be used. It may be catalyzed, in liquid or tape form or any other suitable configuration.

Figure 22A:
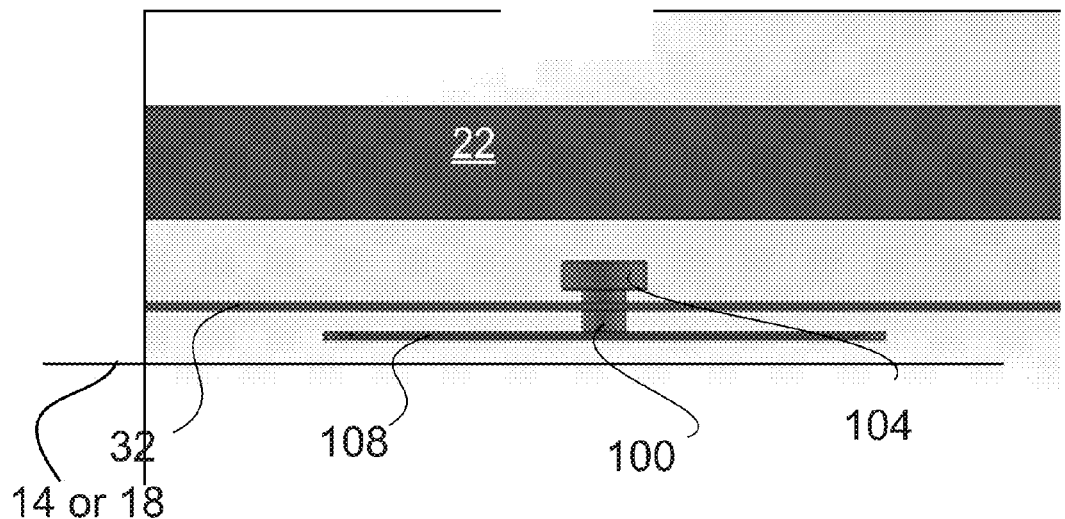
FIG. 22A is an enlarged cross section along the lines 22A-22A of FIG. 22
Figure 22:
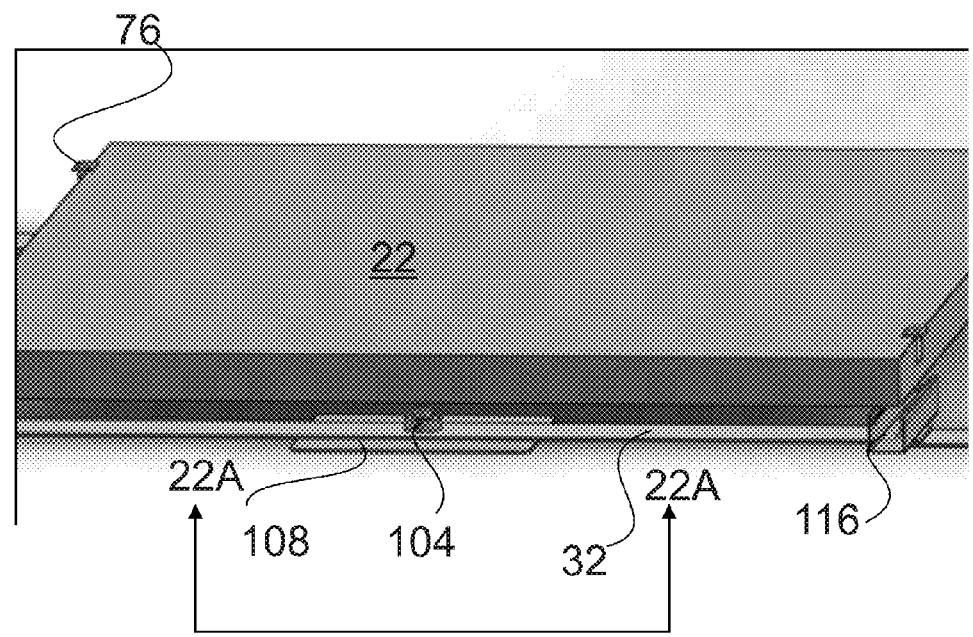
FIG. 22 is a perspective view of a method of attaching a modular strap to a flat or flat or tilted roof using a stud and bolt.

FIGS. 22 and 22A illustrate the use of threaded studs 100 for fastening down the strap assemblies 32. The studs 100 pass through holes 92 in the assemblies 32 and the straps 28 are fastened to the studs 100 with nuts 104. The studs 100 must be pre-joined to the substrate 18 such as with inserts or, as illustrated, in FIG. 12A by fastening a plate 108 trapped on the stud 100 to the substrate 18. Again this plate 108 may be fastened to the substrate 18 via any suitable method such as nails or adhesive.

Figure 23:
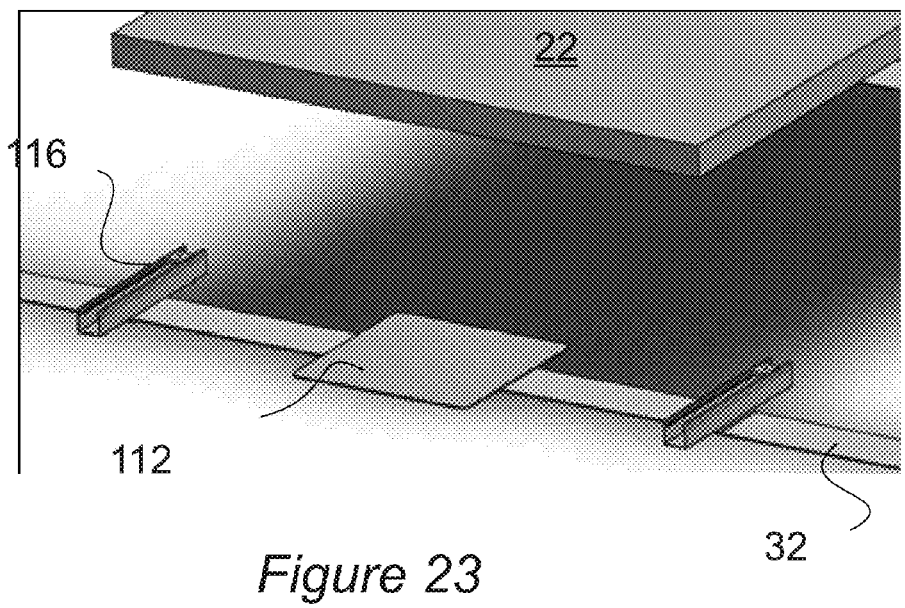
FIG. 23 is an expanded perspective view of a method of attaching a modular strap to a flat or tilted roof using welding.

FIG. 23 illustrates use of welding for fastening down the strap assemblies 32. In this method, a strip of roofing material 112 is laid over the strap assembly 32 and bonded to the underlying roof material.

Depending on the exact slope, ballast 80 can also be used to hold down the strap assemblies 32. The ballast 80 would have to be inserted between the panels, as shown on FIG. 23A.

Figure 24:
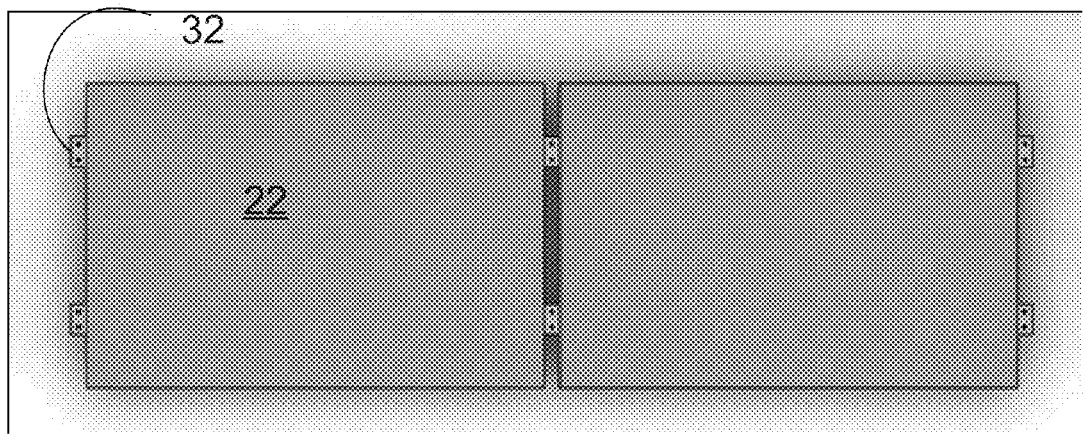
FIG. 24 is a plan view of two solar panels installed on modular straps on a flat or tilted roof in accordance with the teachings of this invention in which the solar panels are installed end to end, and the joints between modular straps are located between the solar panels.
Figure 25:
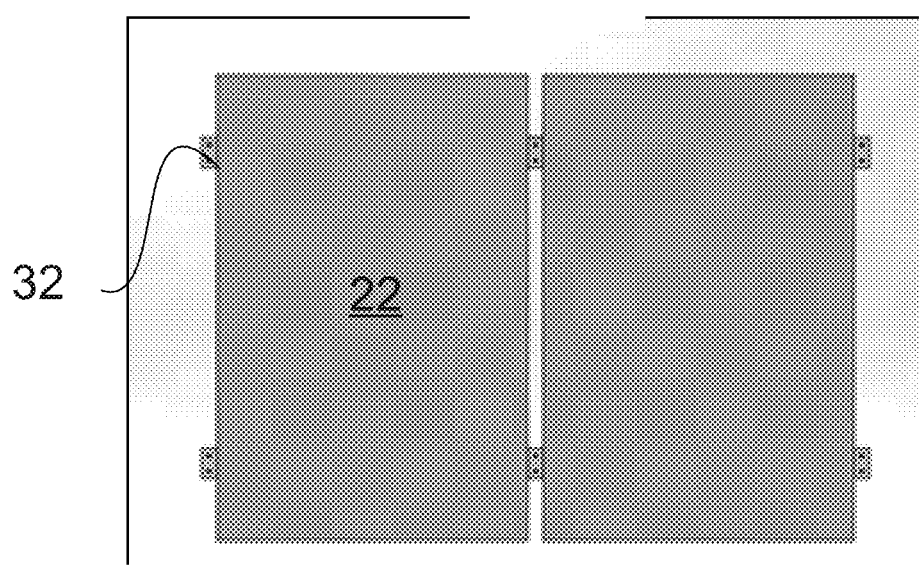
FIG. 25 is a plan view of two solar panels installed on modular straps on a flat or tilted roof in accordance with the teachings of this invention in which the solar panels are installed side to side and the modular straps are under the solar panels.
Figure 26A:
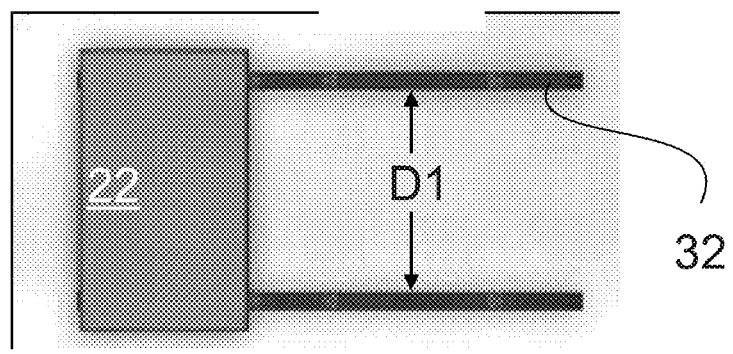
FIGS. 26A-26C illustrate that strap packs can be installed at differing separations.
Figure 26B:
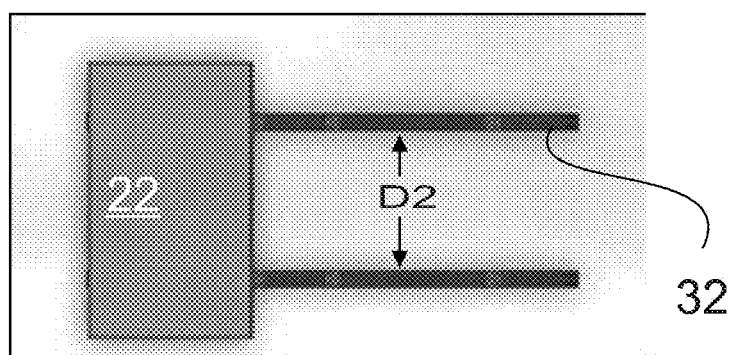
Figure 26C:
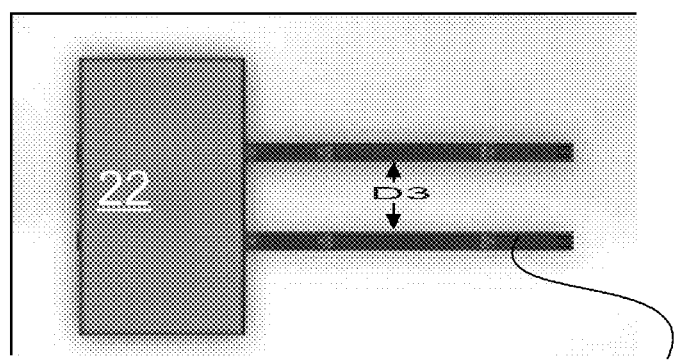
Figure 27:
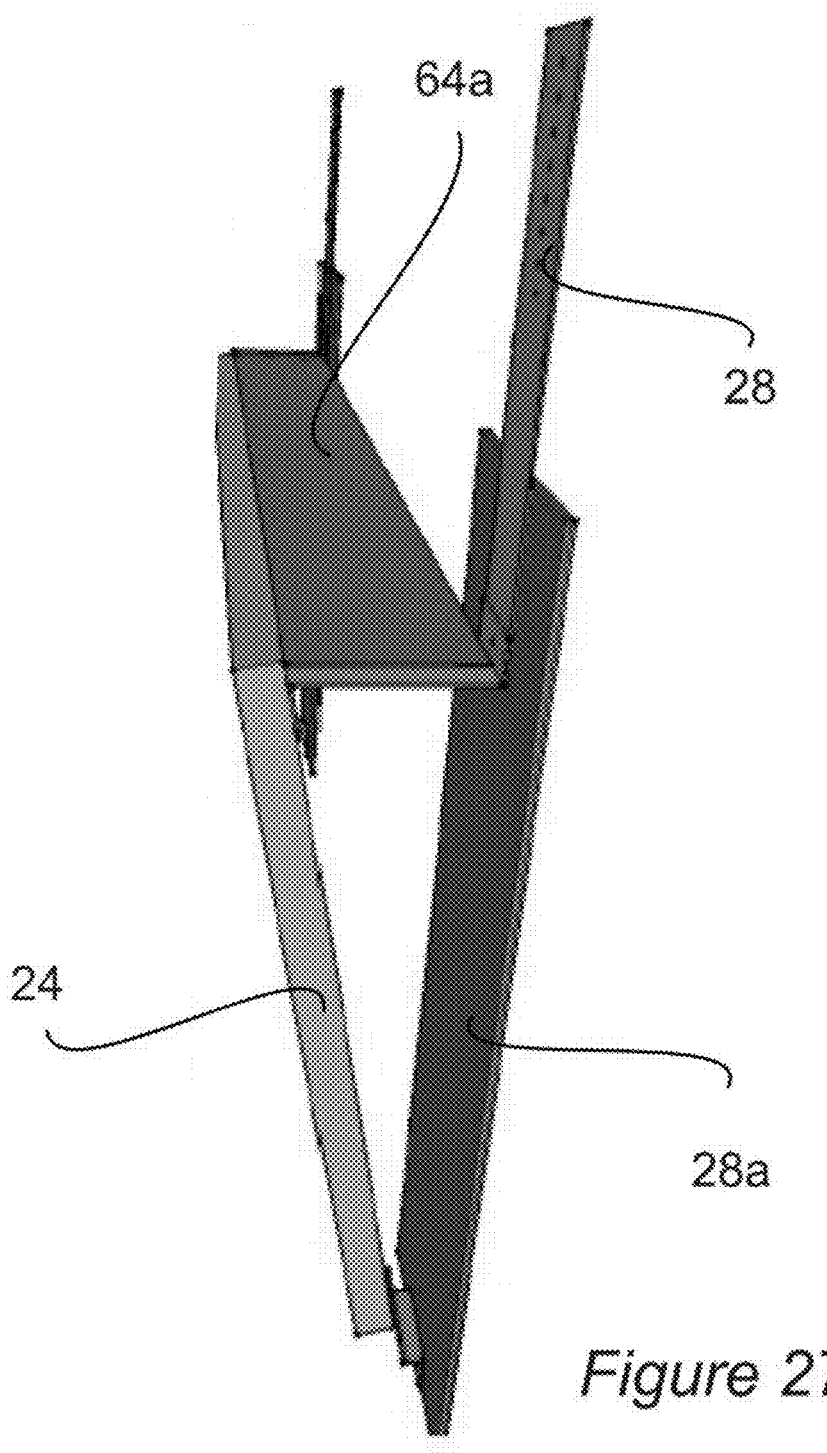
FIG. 27 is a perspective view of one unit of the instant invention having modular straps of two different widths and in which one bracket extends from one strap to the other.
Figure 28:
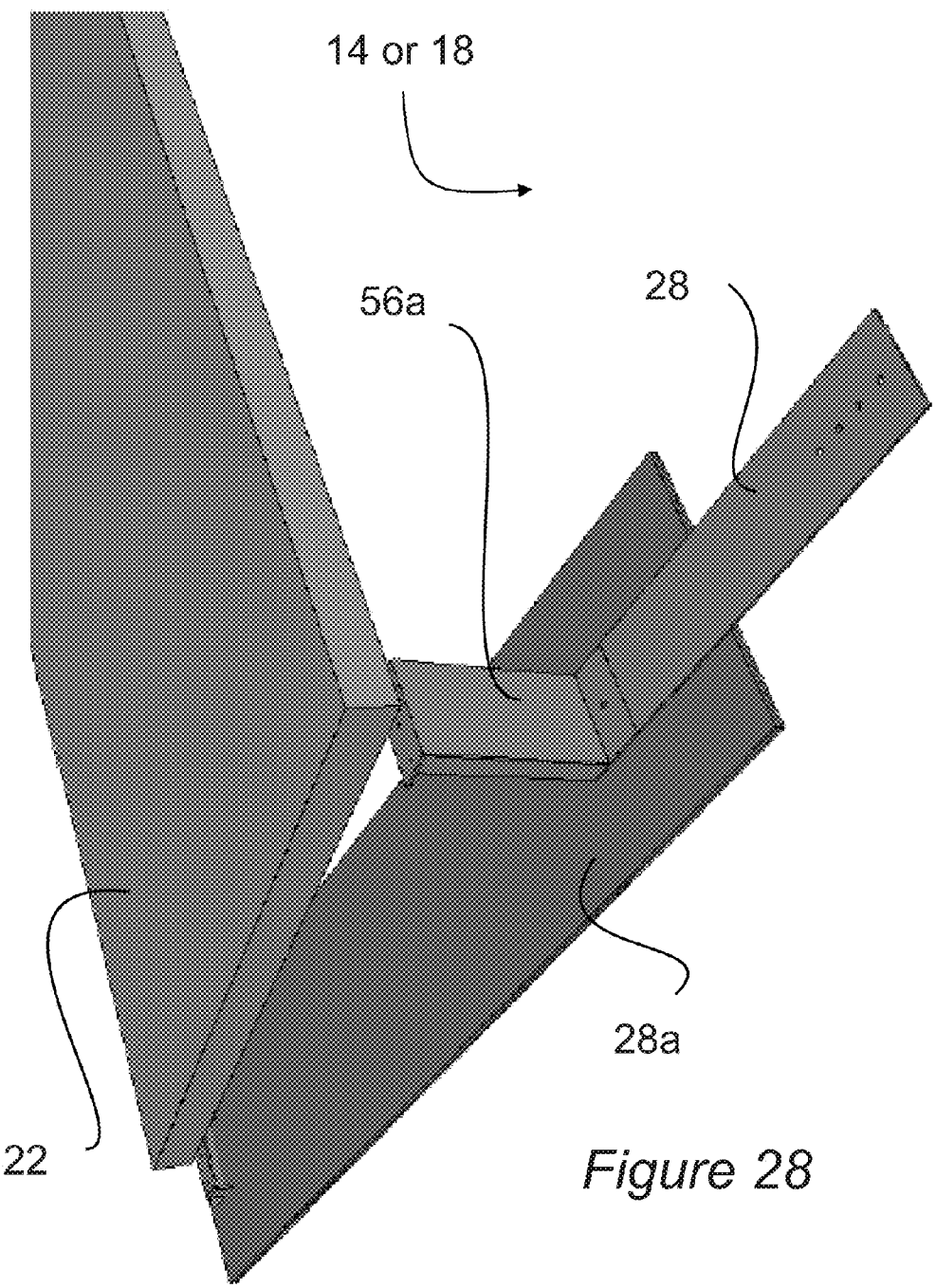
FIG. 28 is a perspective view of an embodiment of the instant invention having modular straps of two different widths.

There are a number of variations that can be applied to assemblies in accordance with this invention. As shown on FIG. 24, the straps 28 can be fastened to each other between solar panels 22, 24. As illustrated on FIGS. 24 and 25 the solar panels 22, 24 can be assembled end to end or side to side. As illustrated on FIGS. 26, 26A and 26B, the distance D between strap assemblies 32 can be varied. As illustrated on FIG. 27 the brackets 56 can extend all the way across the solar panel 22 from strap assembly 32 to strap assembly. As illustrated on FIGS. 27 and 28, the straps 28, 28a in an assembly 32 can be of different widths.

The following reference numbers are used on the Figures:
10 this invention
10a embodiment intended to be attached to flat surfaces
10b embodiment intended to be attached to flat or tilted surfaces
14 flat surface
18 flat or tilted surface
22 solar panel
24 solar panel frame
28 modular strap
30a one end of modular strap
30b other end of modular strap
32 strap assembly
36 hole pattern
40 holes in hole pattern
44 slots in hole pattern
48a top of strap
52 bracket
52a taller bracket
52b shorter bracket
56 bottom flange of bracket
56a bottom flange of taller bracket
56b bottom flange of shorter bracket
60 top flange of bracket
60a top flange of taller bracket
60b bottom flange of taller bracket
64 bracket body
64a body of taller bracket
64b body of shorter bracket
68 fastener
76 clip
80 ballast
84 ballast container
88 pointed fastener
92 hole in strap assembly
96 adhesive
100 threaded stud
104 nut
108 fastening plate
112 strip of roofing material
116 mounting channel
118 threaded insert
124 slot or groove in side of channel
128 side of channel
132 plate
136 central through hole in clip
140 threaded hole in center of plate
144 threaded bolt
148 threaded bolt
152 screw
D distance between strap assemblies This invention has been described with reference to a particular embodiments and variations. However, it should be obvious to those skilled in the art to which this invention pertains that other modifications and enhancements can be made without departing from the spirit and scope of the claims that follow.

Thus, the present invention has been described herein with reference to particular embodiments for particular applications. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An apparatus for mounting a solar collector panel or a solar collector panel mounted within a frame to a surface comprising:
   a) a strap assembly comprising a plurality of straps, each having a full-thickness end, attached in a straight line end overlapping end wherein the plurality of straps have different widths;
   b) a support having a body having a top end and a bottom end, a top flange attached to the top end of the body and a bottom flange attached to the bottom end of the body; the body having a cross section selected from a group comprising: a C-shaped cross-section, a Z-shaped cross-section, and an I-shaped cross section; said flanges being in line with said straight line; said bottom flange attached to at least one of said plurality of straps; said top flange being directly attached with a fastener to one of said solar collector panel and said frame;
   c) a first attaching means attaching said bottom flange to said strap assembly; and
   d) a second attaching means attaching said strap assembly to said surface.

2. An apparatus as claimed in claim 1 in which said top flange is parallel to said surface.

3. An apparatus as claimed in claim 1 in which said top flange is at an angle to said surface.

4. An apparatus as claimed in claim 1 in which said support comprises a first support and a second support spaced apart from each other.

5. An apparatus as claimed in claim 4 in which a height of said first support is greater than a height of said second support.

6. An apparatus as claimed in claim 1 in which a length of said support is greater than a width of said strap.

7. An apparatus as claimed in claim 1 in which said end has a hole pattern through which said ends of said straps are attached to each other.

8. An apparatus as claimed in claim 7 in which said bottom flange has said hole pattern through which said bottom flange is additionally attached to said ends of two of said straps.

9. An apparatus as claimed in claim 1 in which said second attaching means is selected from the group comprising:
   a) a nail;
   b) a spike;
   c) adhesive;
   d) bolting to a stud attached to said surface;
   e) welding;
   f) ballast; and
   g) combinations of these.

10. An apparatus as claimed in claim 1 in which said first attaching means comprises:
   a) a clip, adapted to clamp to said panel or said frame;
   b) said clip being placed on, transverse to, over a top edge of, and at a side of said panel or said frame;

c) said clip and said top flange being fastened to each other so that said panel or said frame is clamped to said top flange.

11. An apparatus for mounting a solar collector panel or a solar collector panel mounted within a frame to a surface comprising:
   a) a strap assembly comprising a plurality of straps, each having a full-thickness end, attached end overlapping end;
   b) a first attaching means for attaching one of said panel and said frame directly to said strap assembly; said first attaching means comprising a fastener, an insert, and a clip; the insert being threaded into the end of a first strap of the plurality of straps and into the overlapping end of a second of the plurality of straps; the clip being disposed between two solar collector panels; the fastener having a threaded end and being inserted into the clip, wherein threading of the fastener into the inserts clamps the two solar collector panels directly to the first strap and the second strap; and
   c) a second attaching means for attaching said strap assembly to said surface.

12. An apparatus as claimed in claim 11 in which said straps have different widths.

13. An apparatus as claimed in claim 11 in which said end has a hole pattern through which said straps are attached to each other, adjacent their ends.

14. An apparatus as claimed in claim 11 in which said second attaching means is selected from the group comprising:
   a) a nail;
   b) a spike;
   c) adhesive;
   d) bolting to a stud attached to said surface;
   e) welding;
   f) ballast; and
   g) combinations of these.

15. An apparatus for mounting a solar collector panel or a solar collector panel mounted within a frame to a surface comprising:
   a. a strap assembly comprising a plurality of straps, each having a full thickness end, attached end overlapping end;
   b) a U shaped channel having a base and an opening opposite said base; said base having at least one hole, the base being attached to said strap assembly by a fastener, wherein the fastener passes through the at least one hole and overlapping ends of the plurality of straps to connect the U shaped channel to the overlapping ends of the plurality of straps;
   c) a first attaching means for attaching one of said panel and said frame directly to said U shaped channel; and
   d) a second attaching means for attaching said strap assembly to said surface.

16. An apparatus as claimed in claim 15 in which said straps have different widths.

17. An apparatus as claimed in claim 15 in which said first attaching means is adhesive.

18. An apparatus as claimed in claim 15 in which said end has a hole pattern through which said straps are attached to each other, adjacent their ends.

19. An apparatus as claimed in claim 15 in which said second attaching means is selected from the group comprising:
   a) a nail;
   b) a spike;
   c) adhesive;
   d) bolting to a stud attached to said surface;
   e) welding;
   f) ballast; and
   g) combinations of these.

20. An apparatus as claimed in claim 15 in which said first attaching means comprises:
   a) a clip, adapted to clamp to said panel or said frame;
   b) said clip being placed, transverse to, over a top edge of, and at a side of said panel or said frame;
   c) said clip and said channel being fastened to each other so that said panel or said frame is clamped to said channel.

21. An apparatus as claimed in claim 20 in which said U-shaped channel further comprises:
   a) a plate slidably installed, parallel to said base in said channel; and
   b) a clip, adapted to clamp to said panel or said frame, placed on, transverse to, over a top edge of, and at a side of said panel or said frame; said clip and said plate fastened to each other so that said panel or said frame is clamped to said channel.

* * * * *